(12) United States Patent
Yang et al.

(10) Patent No.: US 12,081,307 B2
(45) Date of Patent: Sep. 3, 2024

(54) METHOD FOR SETTING RECEPTION BEAM IN ELECTRONIC DEVICE RECEIVING SIGNALS TRANSMITTED FROM PLURALITY OF TRPS AND ELECTRONIC DEVICE

(71) Applicant: Samsung Electronics Co., Ltd., Suwon-si (KR)

(72) Inventors: Minho Yang, Suwon-si (KR); Taeyoon Kim, Suwon-si (KR); Hyoungjoo Lee, Suwon-si (KR); Yonggue Han, Suwon-si (KR); Chaiman Lim, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 17/969,380

(22) Filed: Oct. 19, 2022

(65) Prior Publication Data
US 2023/0179283 A1   Jun. 8, 2023

Related U.S. Application Data

(63) Continuation of application No. PCT/KR2022/012455, filed on Aug. 19, 2022.

(30) Foreign Application Priority Data

Dec. 8, 2021   (KR) .................. 10-2021-0174542
Dec. 16, 2021  (KR) .................. 10-2021-0180403

(51) Int. Cl.
*H04B 7/08*   (2006.01)
*H04W 72/23*  (2023.01)

(52) U.S. Cl.
CPC ........ *H04B 7/0888* (2013.01); *H04B 7/0857* (2013.01); *H04W 72/23* (2023.01)

(58) Field of Classification Search
CPC .................. H04B 7/0888; H04B 7/0857; H04B 7/06952; H04B 7/024; H04B 7/088; H04W 72/23; H04L 5/0023; H04L 5/0035
(Continued)

(56) References Cited

U.S. PATENT DOCUMENTS 11,271,621 B2   3/2022  Noh et al.
11,284,381 B2   3/2022  Park et al.
(Continued)

FOREIGN PATENT DOCUMENTS

CN     112118036 A      12/2020
KR  10-2020-0047202 A    5/2020
(Continued)

OTHER PUBLICATIONS

ZTE, 'Enhancements on beam management for multi-TRP', R1-2104587, 3GPP TSG RAN WG1 Meeting#105-e, e-Meeting, May 12, 2021.
(Continued)

*Primary Examiner* — Emmanuel Bayard
(74) *Attorney, Agent, or Firm* — Jefferson IP Law, LLP

(57) ABSTRACT

An electronic device is provided. The electronic device includes a plurality of antenna modules, and a communication processor. The communication processor may be configured to identify information set for reception of different signals transmitted from a plurality of transmission and reception points (TRPs), identify information related to a strength of a reference signal corresponding to a first TRP among the plurality of TRPs and information related to a strength of a reference signal corresponding to a second TRP among the plurality of TRPs, for a plurality of reception
(Continued)

beams set in the plurality of antenna modules, respectively, identify that a first reception beam of a first antenna module among the plurality of antenna modules is selected to receive a signal transmitted from the first TRP and a second reception beam of the first antenna module is selected to receive a signal transmitted from the second TRP, and receive a signal corresponding to the first TRP and a signal corresponding to the second TRP based on a third reception beam of the first antenna module.

20 Claims, 24 Drawing Sheets

(58) Field of Classification Search
USPC .......................... 375/267, 299, 346, 347, 349
See application file for complete search history.

(56) References Cited

U.S. PATENT DOCUMENTS

| | | | |
|---|---|---|---|
| 2019/0028170 A1 | 1/2019 | Zhang et al. | |
| 2019/0182767 A1 | 6/2019 | Deng et al. | |
| 2019/0215220 A1* | 7/2019 | Islam | H04W 74/0833 |
| 2020/0014454 A1 | 1/2020 | Guo et al. | |
| 2020/0053752 A1 | 2/2020 | Huang et al. | |
| 2020/0169312 A1 | 5/2020 | Black et al. | |
| 2020/0221429 A1 | 7/2020 | Li et al. | |
| 2020/0244338 A1 | 7/2020 | Raghavan et al. | |
| 2020/0367230 A1 | 11/2020 | Raghavan et al. | |
| 2021/0112561 A1 | 4/2021 | Zhou et al. | |
| 2021/0167821 A1 | 6/2021 | Chen et al. | |
| 2021/0243659 A1* | 8/2021 | Cirik | H04L 5/0048 |
| 2021/0360649 A1* | 11/2021 | Athley | H04W 72/542 |
| 2021/0368369 A1* | 11/2021 | Zhang | H04W 24/10 |
| 2022/0201695 A1* | 6/2022 | Landis | H04B 7/063 |
| 2022/0224392 A1* | 7/2022 | Berliner | H04B 7/0417 |
| 2022/0271791 A1* | 8/2022 | Zhang | H04B 1/525 |

FOREIGN PATENT DOCUMENTS

| | | |
|---|---|---|
| KR | 10-2020-0087023 A | 7/2020 |
| WO | 2018-085374 A1 | 5/2018 |
| WO | 2020-069333 A1 | 4/2020 |

OTHER PUBLICATIONS

International Search Report dated Nov. 21, 2022, issued in an International Application No. PCT /KR2022/012455.

\* cited by examiner

|  |  |  |  |  |  |  |  |  |
|---|---|---|---|---|---|---|---|---|
| 800 | R | Serving Cell ID | | | | | BWP ID | | Oct 1 |
| | $T_7$ | $T_6$ | $T_5$ | $T_4$ | $T_3$ | $T_2$ | $T_1$ | $T_0$ | Oct 2 |
| | $T_{15}$ | $T_{14}$ | $T_{13}$ | $T_{12}$ | $T_{11}$ | $T_{10}$ | $T_9$ | $T_8$ | Oct 3 |

. . .

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

| | | |
|---|---|---|
| 850 | Serving Cell ID | CORESET ID | Oct 1 |
| | CORESET ID | TCI state ID | Oct 2 |

FIG. 8

METHOD FOR SETTING RECEPTION BEAM IN ELECTRONIC DEVICE RECEIVING SIGNALS TRANSMITTED FROM PLURALITY OF TRPS AND ELECTRONIC DEVICE

CROSS-REFERENCE TO RELATED APPLICATION(S)

This application is a continuation application, claiming priority under § 365(c), of an International application No. PCT/KR2022/012455, filed on Aug. 19, 2022, which is based on and claims the benefit of a Korean patent application number 10-2021-0174542, filed on Dec. 8, 2021, in the Korean Intellectual Property Office, and of a Korean Patent Application No. 10-2021-0180403, filed on Dec. 16, 2021, in the Korean Intellectual Property Office, the disclosures of all of which are incorporated by reference herein in their entireties.

TECHNICAL FIELD

The disclosure relates to a method for setting a reception beam in an electronic device receiving signals transmitted from a plurality of transmission and reception points (TRPs) and an electronic device.

BACKGROUND ART

In order to meet the demand for wireless data traffic soaring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on a higher frequency band (e.g., a band ranging from 6 gigahertz (GHz) to 60 GHz, or a millimeter wave (mmWave) band). To mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

The above information is presented as background information only to assist with an understanding of the disclosure. No determination has been made, and no assertion is made, as to whether any of the above might be applicable as prior art with regard to the disclosure.

DISCLOSURE

Technical Problem

For example, 5G wireless communication systems may use multiple antenna-based beamforming technology to overcome high signal attenuation upon transmission and reception of signals on a mmWave frequency band (e.g., above 6 GHz, frequency range 2 (FR2)). Beamforming is a method to maximize the signal transmission/reception gain in the direction to be oriented by adjusting the phase per antenna.

According to various embodiments of the disclosure, an electronic device may include a plurality of antenna modules. Each antenna module may set an optimal reception beam to receive a plurality of signals transmitted from different directions. For example, the signals transmitted from a plurality of transmission and reception points (TRPs) may be respectively received through a plurality of antenna modules of the electronic device. The plurality of antenna modules may set an optimal reception beam capable of receiving the signals transmitted from the TRPs, respectively. For example, the signal transmitted from the first TRP may be received based on the optimal reception beam set in the first antenna module of the electronic device, and the signal transmitted from the second TRP may be received based on the optimal reception beam set in the second antenna module of the electronic device.

According to various embodiments of the disclosure, the optimal reception beam for each of the signals transmitted from the plurality of TRPs may be set as reception beams for the same antenna modules among the plurality of antenna modules. In this case, in a case where a plurality of reception beams cannot be formed in one antenna module due to restrictions on the antenna modules in the electronic device, as the reception beam optimal for any one TRP is set, the reception strength of the signal transmitted from another TRP may be relatively reduced. When the reception strength of the signal transmitted from any one of the plurality of TRPs decreases, the overall communication performance of the electronic device may decrease.

Aspects of the disclosure are to address at least the above-mentioned problems and/or disadvantages and to provide at least the advantages described below. Accordingly, an aspect of the disclosure is to provide a method for setting a reception beam in an electronic device and an electronic device, capable of increasing the communication performance of the electronic device when the optimal reception beams corresponding to the signals transmitted from a plurality of TRPs are set in one antenna module among a plurality of antenna modules in the context where the electronic device receives the signals from the plurality of TRPs (e.g., non-coherent joint transmission (NC-JT) situation).

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a plurality of antenna modules, and a communication processor. The communication processor may be configured to identify information set for reception of different signals transmitted from a plurality of transmission and reception points (TRPs), identify information related to a strength of a reference signal corresponding to a first TRP among the plurality of TRPs and information related to a strength of a reference signal corresponding to a second TRP among the plurality of TRPs, for a plurality of reception beams set in the plurality of antenna modules, respectively, based on the set information, identify that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP, and receive a signal corresponding to the first TRP and a signal corresponding to the second TRP based on a third reception beam of the first antenna module, based on identifying that the first reception beam and the second reception beam are selected.

In accordance with another aspect of the disclosure, a method for setting a reception beam by an electronic device is provided. The method includes identifying information set for reception of different signals transmitted from a plurality of transmission and reception points (TRPs, identifying information related to a strength of a reference signal corresponding to a first TRP among the plurality of TRPs and information related to a strength of a reference signal corresponding to a second TRP among the plurality of TRPs, for a plurality of reception beams set in the plurality of antenna modules, respectively, included in the electronic device, based on the set information, identifying that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP, and receiving a signal corresponding to the first TRP and a signal corresponding to the second TRP based on a third reception beam of the first antenna module, based on identifying that the first reception beam and the second reception beam are selected.

Advantageous Effects

According to various embodiments of the disclosure, when it is impossible to simultaneously set the optimal reception beam for each TRP due to restrictions on the antenna modules of the electronic device in the communication environment (e.g., non-coherent joint transmission (NC-JT) communication environment) where the electronic device receives the signals transmitted from the plurality of TRPs, a reception beam capable of increasing the communication performance of the electronic device may be set.

According to various embodiments of the disclosure, it is possible to increase the reception probability of physical downlink control channel (PDCCH) data or the transmission rate of physical downlink shared channel (PDSCH) data by changing the reception beam considering the reception signal strength of the signals transmitted from a plurality of TRPs.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings.

FIG. 8 is a view illustrating a media access control (MAC) control element (CE) structure for transmission configuration indicator (TCI) state activation, according to an embodiment of the disclosure.

Throughout the drawings, it should be noted that like reference numbers are used to depict the same or similar elements, features, and structure.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
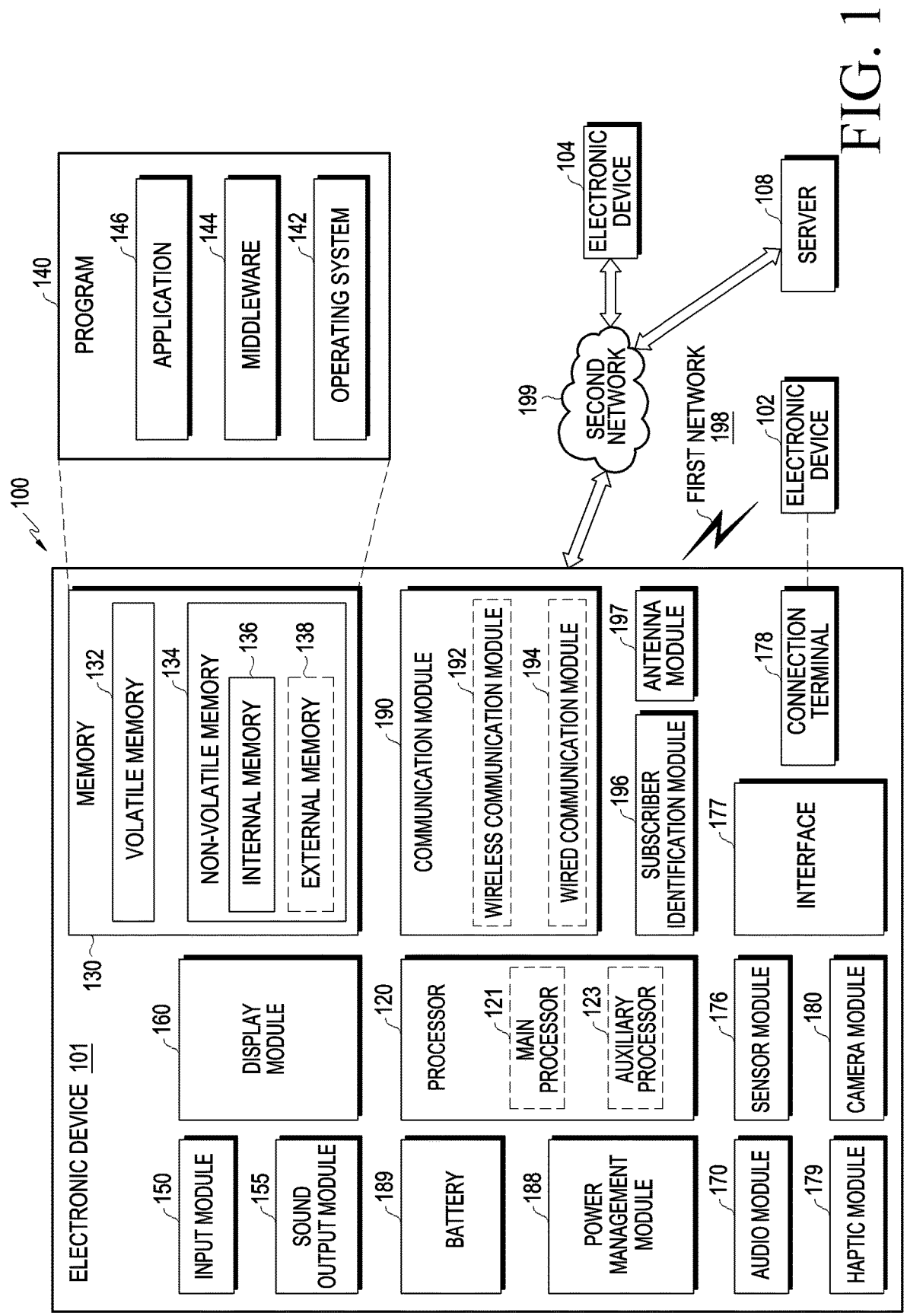
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
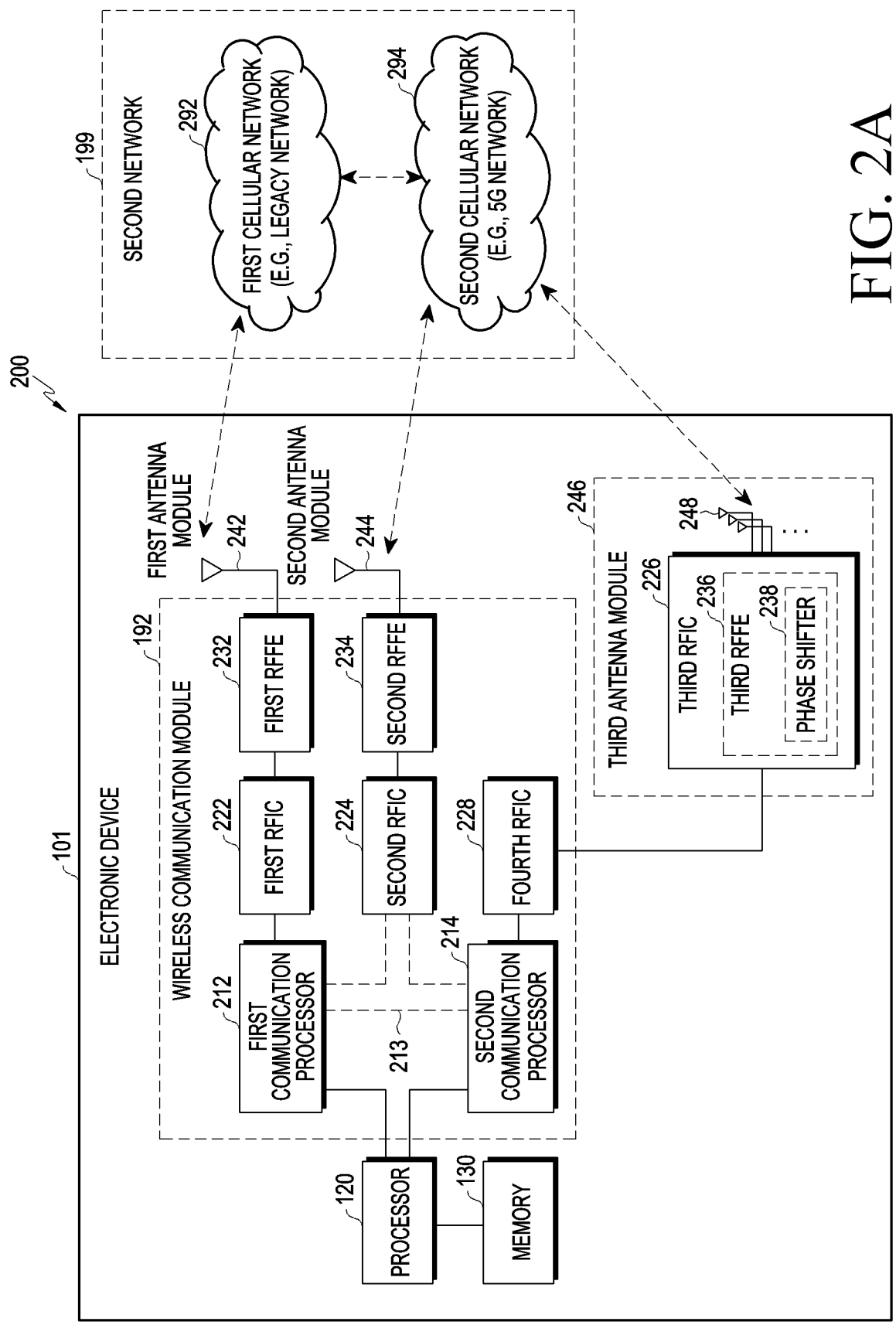
FIG. 2A is a block diagram illustrating an electronic device for supporting legacy network communication and 5th generation (5G) network communication according to an embodiment of the disclosure.

FIG. 2A is a block diagram 200 illustrating an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment of the disclosure, the electronic device 101 may further include at least one component among the components of FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment of the disclosure, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments of the disclosure, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to various embodiments of the disclosure, the second cellular network 294 may be a 5G network defined by the 3rd generation partnership project (3GPP). Additionally, according to an embodiment of the disclosure, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as detection information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment of the disclosure, the first communication processor 212 and the second communication processor 214 may be implemented in a single chip or a single package. According to various embodiments of the disclosure, the first communication processor 212 or the second communication processor 214, along with the processor 120, an assistance processor 123, or communication module 190, may be formed in a single chip or single package.

Figure 2B:
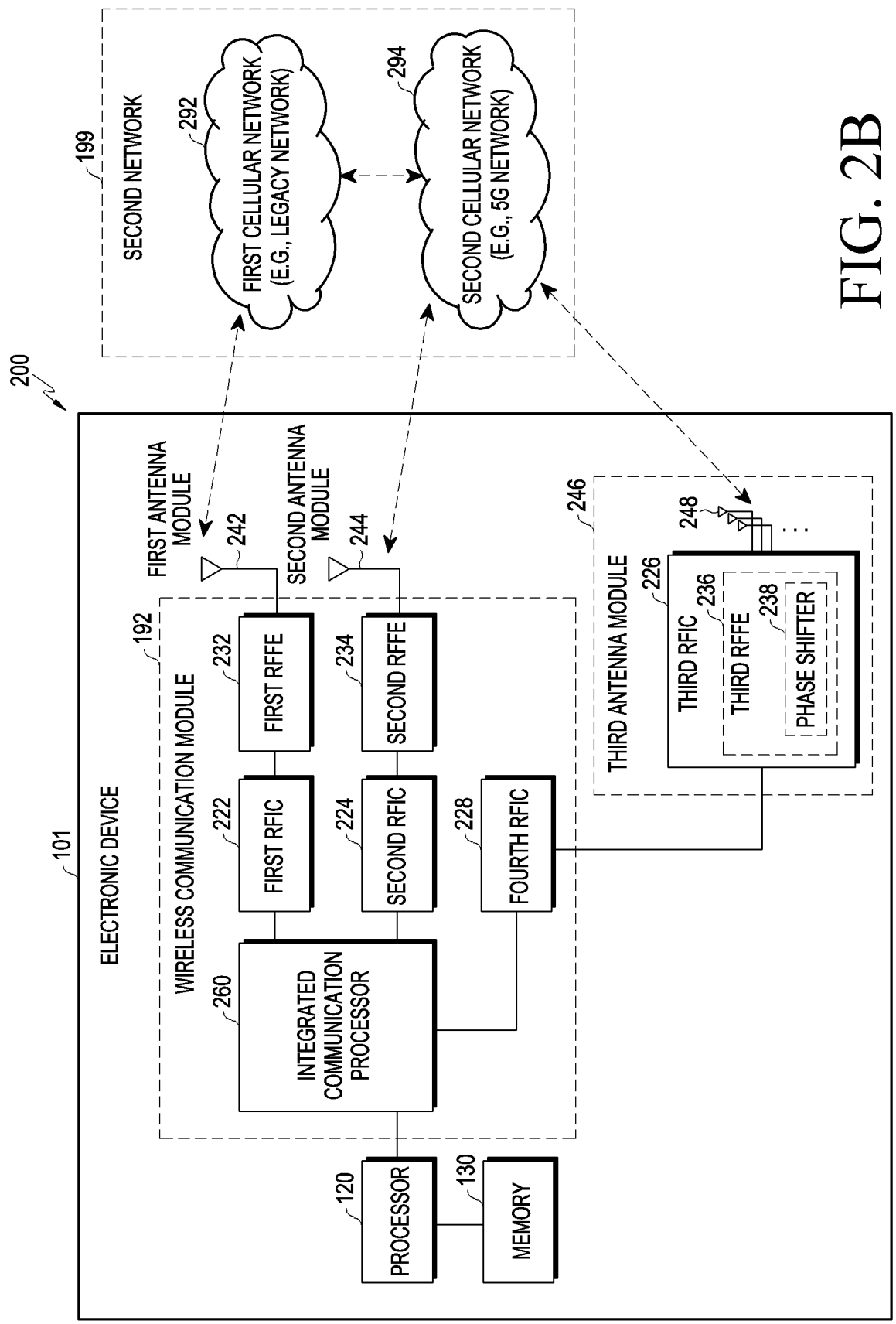
FIG. 2B is a block diagram illustrating an electronic device for supporting legacy network communication and 5G network communication according to an embodiment of the disclosure.

FIG. 2B is a block diagram illustrating an electronic device for supporting legacy network communication and 5G network communication according to an embodiment of the disclosure.

Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment of the disclosure, the third RFFE 236 may be formed as part of the third RFIC 226.

According to an embodiment of the disclosure, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment of the disclosure, the first RFIC 222 and the second RFIC 224 may be implemented as at least part of a single chip or single package. According to various embodiments of the disclosure, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, at least one of the first antenna module 242 or the second antenna module 244 may be omitted or be combined with another antenna module to process multi-band RF signals.

According to an embodiment of the disclosure, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment of the disclosure, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., new radio (NR) protocol information) for communication with the 5G network may be stored in the memory 230 and be accessed by other components (e.g., the processor 120, the first communication processor 212, or the second communication processor 214).

Figure 3:
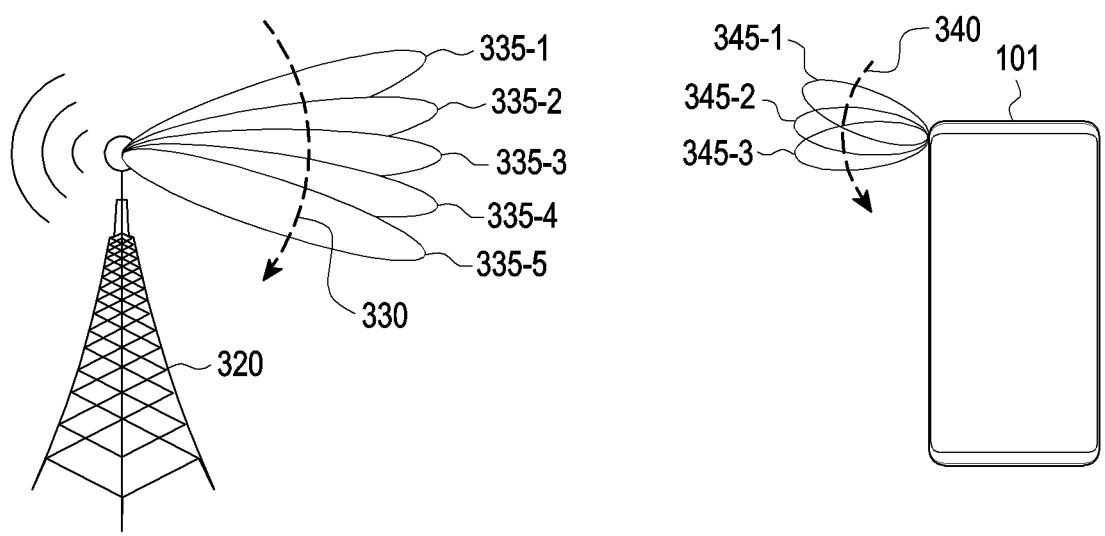
FIG. 3 is a view illustrating an operation for wireless communication connection between a base station and an electronic device according to an embodiment of the disclosure.

FIG. 3 illustrates an embodiment of an operation for wireless communication connection between an electronic device and a base station according to an embodiment of the disclosure.

Referring to FIG. 3, first, the base station (gNodeB (gNB), transmission reception point (TRP)) 320 may perform beam detection with the electronic device 101 for the wireless communication connection. In the shown embodiment of the disclosure, for beam detection, the base station 320 may sequentially send out a plurality of transmission beams, e.g., a first to fifth transmission beam 335-1 to 335-5 with different directions, thereby performing transmission beam sweeping 330 at least once.

The first to fifth transmission beams 335-1 to 335-5 may include at least one synchronization signal block (SSB) (e.g., synchronization sequence/physical broadcast channel (SS/PBCH) block). The SS/PBCH block may be used to periodically measure the channel or beam strength of the electronic device 101.

In another embodiment of the disclosure, the first to fifth transmission beams 335-1 to 335-5 may include at least one channel state information-reference signal (CSI-RS). The CSI-RS is a reference signal that the base station 320 may flexibly configure and may be periodically/semi-persistently or aperiodically transmitted. The electronic device 101 may measure the channel and beam strength using the CSI-RS.

The transmission beams may form a radiation pattern with a selected beam width. For example, the transmission beams may have a broad radiation pattern with a first beam width and a sharp radiation pattern with a second beam width narrower than the first beam width. For example, transmission beams including the SS/PBCH block may have a broader radiation pattern than transmission beams including the CSI-RS.

The electronic device 101 may perform reception beam sweeping 340 while the base station performs transmission beam sweeping 330. For example, while the base station 320 performs first transmission beam sweeping 330, the electronic device 101 may fix a first reception beam 345-1 to a first direction and receive the SS/PBCH block signal transmitted from at least one of the first to fifth transmission beams 335-1 to 335-5. While the base station 320 performs second transmission beam sweeping 330, the electronic device 101 may fix a second reception beam 345-2 to a second direction and fix a third reception beam 345-3 to a third direction and receive the SS/PBCH block signals transmitted from the first to fifth transmission beams 335-1 to 335-5. As such, the electronic device 101 may select a communicable reception beam (e.g., the second reception beam 345-2) and transmission beam (e.g., the third transmission beam 335-3) based on the result of signal reception operation via the reception beam sweeping 340. The selected communicable reception beam (e.g., the second reception beam 345-2) and transmission beam (e.g., the third transmission beam 335-3) may be referred to as a beam pair.

As such, after communicable transmission/reception beams are determined, the base station 320 and the electronic device 101 may transmit and/or receive basic information for cell configuration and configure information for additional beam operation based thereupon. For example, the beam operation information may include detailed information about the configured beam and configuration information about SS/PBCH block, CSI-RS or additional reference signals.

Further, the electronic device 101 may continuously monitor the channel and beam strength using at least one of the SS/PBCH block and CSI-RS included in the transmission beam. The electronic device 101 may adaptively select the beam with good beam quality using the monitoring operation. Optionally, the electronic device 101 may reperform the beam sweeping operation to determine communicable beams if the electronic device 101 moves or beam is blocked so that the communication connection is released.

Figure 4:
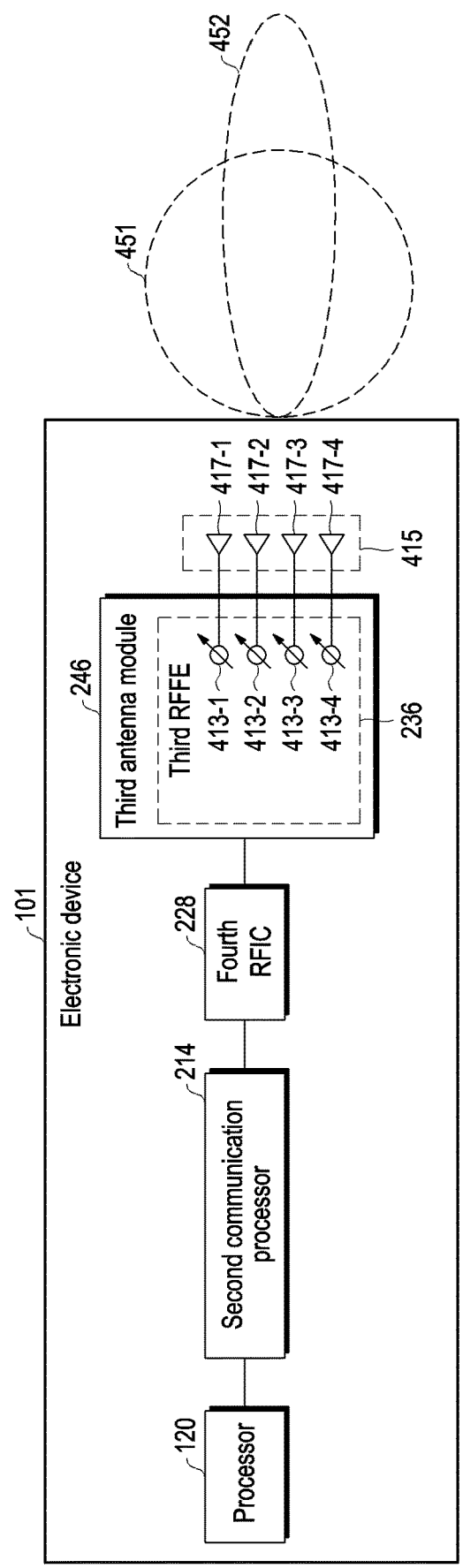
FIG. 4 is a block diagram illustrating an electronic device performing beamforming according to an embodiment of the disclosure.

FIG. 4 is a block diagram illustrating an electronic device for 5G network communication according to an embodiment of the disclosure. The electronic device 101 may include various components as shown in FIG. 2A or 2B. However, for simplicity, FIG. 4 illustrates that the electronic device 101 includes a processor 120, a second communication processor 214, a fourth RFIC 228, and at least one third antenna module 246.

Referring to FIG. 4, the third antenna module 246 may include a first to fourth phase shifter 413-1 to 413-4 (e.g., the phase shifter 238 of FIG. 2A to 2B) and/or a first to fourth antenna element 417-1 to 417-4 (e.g., the antenna 248 of FIG. 2A or 2B). Each of the first to fourth antenna elements 417-1 to 417-4 may be electrically connected to an individual one of the first to fourth phase shifters 413-1 to 413-4. The first to fourth antenna elements 417-1 to 417-4 may form at least one antenna array 415.

The second communication processor 214 may control the first to fourth phase shifters 413-1 to 413-4, controlling the phase of the signals transmitted and/or received via the first to fourth antenna elements 41701 to 417-4 and thus generating a transmission beam and/or reception beam in a selected direction.

According to an embodiment of the disclosure, the third antenna module 246 may form a beam 451 with a broad radiation pattern (hereinafter, a "broad beam") and a beam 452 with a sharp radiation pattern (hereinafter, a "sharp beam") as mentioned above, depending on the number of the antenna elements used. For example, if the third antenna module 246 uses all of the first to fourth antenna elements 417-1 to 417-4, the third antenna module 246 may form the sharp beam 452 and, if using only the first antenna module 417-1 and the second antenna element 417-2, the third antenna module 246 may form the broad beam 451. The broad beam 451 has broader coverage than the sharp beam 452 but has a smaller antenna gain and may thus be more effective in beam discovery. In contrast, the sharp beam 452 has narrower coverage than the broad beam 451 but has a larger antenna gain and may thus enhance communication performance.

According to an embodiment of the disclosure, the second communication processor 214 may use the sensor module 176 (e.g., a nine-axis sensor, grip sensor, or GPS) in beam discovery. For example, the electronic device 101 may adjust the beam discovery position and/or beam discovery period based on the position and/or movement of the electronic device 101 using the sensor module 176. As another example, if the electronic device 101 is gripped by the user, the electronic device 101 may grasp the gripped portion of the user using a grip sensor, thereby selecting an antenna module with relatively better communication performance from among the plurality of third antenna modules 246.

Figure 5A:
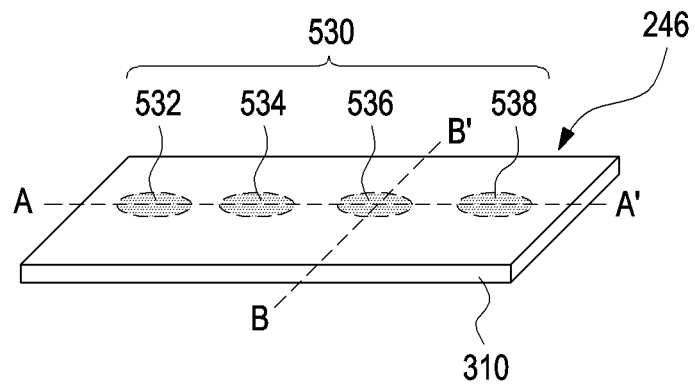
FIGS. 5A, 5B, and 5C are views illustrating a structure of an antenna module according to an embodiment of the disclosure.
Figure 5B:
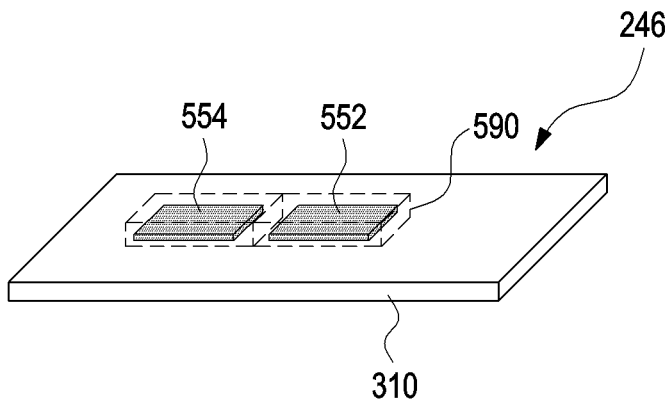
Figure 5C:
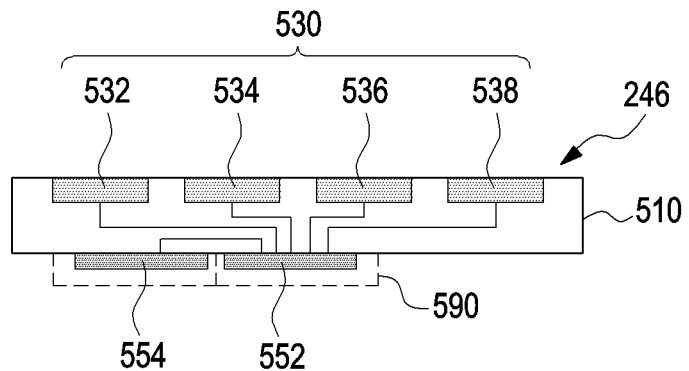

FIGS. 5A, 5B, and 5C illustrate an embodiment of a structure of third antenna module described above in connection with FIGS. 2A and 2B according to an embodiment of the disclosure. FIG. 5A is a perspective view of the third antenna module 246 as viewed from one side, and FIG. 5B is a perspective view of the third antenna module 246 as viewed from another side. FIG. 5C is a cross-sectional view of the third antenna module 246 taken along line A-A'.

Referring to FIGS. 5A, 5B, 5C, according to an embodiment of the disclosure, the third antenna module 246 may include a printed circuit board 510, an antenna array 530, a radio frequency integrated circuit (RFIC) 552, and a power management integrated circuit (PMIC) 554. Selectively, the third antenna module 246 may further include a shielding member 590. According to other embodiments of the disclosure, at least one of the above-mentioned components may be omitted, or at least two of the components may be integrally formed with each other.

The printed circuit board 510 may include a plurality of conductive layers and a plurality of non-conductive layers alternately stacked with the conductive layers. Electronic components arranged on, or outside of, the printed circuit board 510 may be electrically connected together via wires and conductive vias formed on or through the conductive layers.

The antenna array 530 (e.g., 248 of FIGS. 2A and 2B) may include a plurality of antenna elements 532, 534, 536, or 538 arranged to form directional beams. The antenna elements may be formed on a first surface of the printed circuit board 510 as shown. According to another embodiment of the disclosure, the antenna array 530 may be formed inside the printed circuit board 510. According to embodiments of the disclosure, the antenna array 530 may include a plurality of antenna arrays (e.g., a dipole antenna array and/or a patch antenna array) of the same or different shapes or kinds.

The RFIC 552 (e.g., 226 of FIGS. 2A and 2B) may be disposed in another area (e.g., a second surface opposite to the first surface) of the PCB 510 which is spaced apart from the antenna array. The RFIC 552 may be configured to be able to process signals of a selected frequency band which are transmitted or received via the antenna array 530. According to an embodiment of the disclosure, upon transmission, the RFIC 552 may convert a baseband signal obtained from a communication processor (e.g., the second communication processor 214) into a designated band of RF signal. Upon receipt, the RFIC 552 may convert the RF signal received via the antenna array 552 into a baseband signal and transfer the baseband signal to the communication processor.

According to another embodiment of the disclosure, upon transmission, the RFIC 552 may up-convert an IF signal (e.g., ranging from about 9 GHz to about 11 GHz) obtained from the intermediate frequency integrated circuit (IFIC) (e.g., the fourth RFIC 228 of FIGS. 2A and 2B) into a selected band of RF signal. Upon receipt, the RFIC 552 may down-convert the RF signal obtained via the antenna array 552 into an IF signal and transfer the IF signal to the IFIC (e.g., the fourth RFIC 228 of FIGS. 2A and 2B).

The PMIC 554 may be disposed in another portion (e.g., the second surface) of the printed circuit board 510 which is spaced apart from the antenna array. The PMIC may receive a voltage from a main PCB (not shown) and provide necessary power to various components (e.g., the RFIC 552) on the antenna module.

The shielding member 590 may be disposed in a portion (e.g., the second surface) of the PCB 510 to electromagnetically shield off at least one of the RFIC 552 or the PMIC 554. According to an embodiment of the disclosure, the shielding member 590 may include a shield can.

Although not shown, according to various embodiments of the disclosure, the third antenna module 246 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 552 and/or the PMIC 554 may be electrically connected with the printed circuit board via the connecting member.

Figure 6:
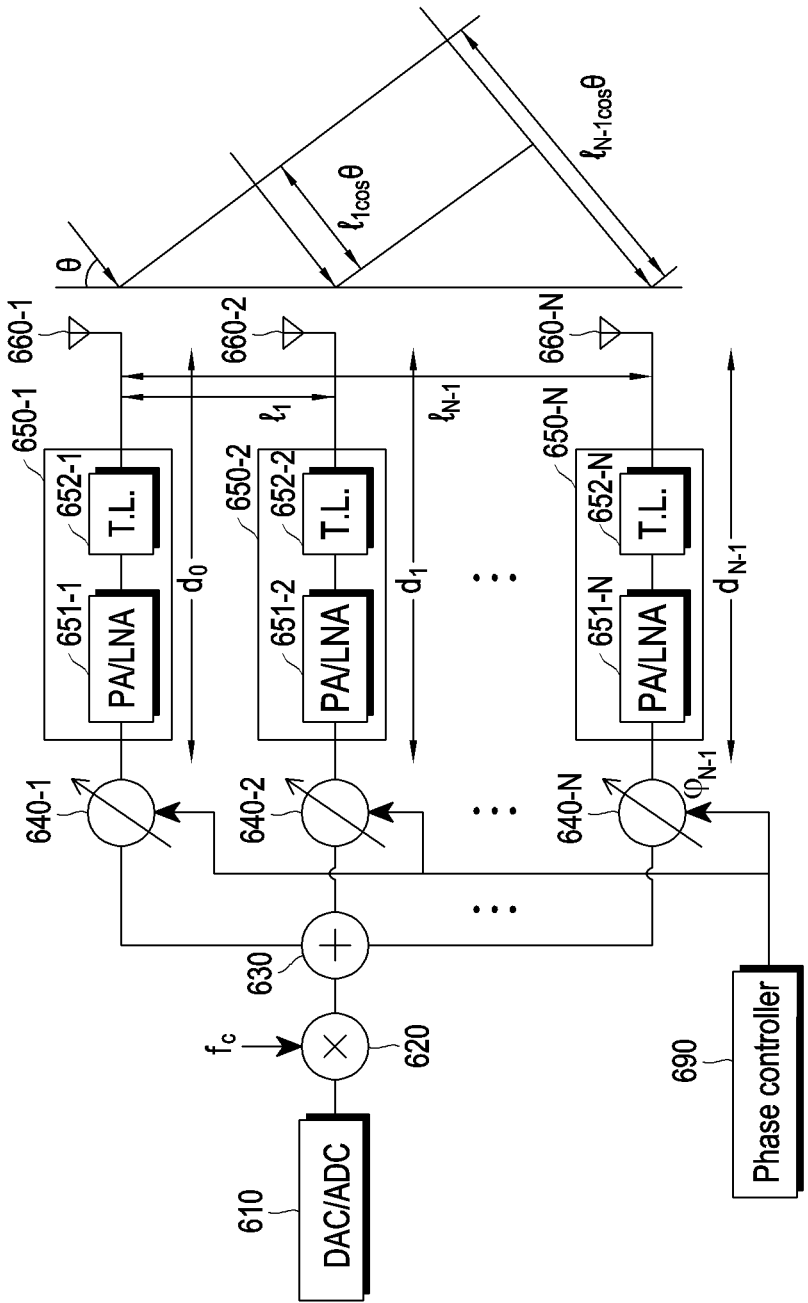
FIG. 6 is a view illustrating a structure of an antenna module for generating a reception beam in an electronic device, according to an embodiment of the disclosure.

FIG. 6 is a view illustrating a structure of an antenna module for generating a reception beam in an electronic device, according to an embodiment of the disclosure.

Referring to FIG. 6, according to various embodiments of the disclosure, an electronic device 601 (e.g., the electronic device 101) may include at least one of a digital-to-analog converter (DAC)/analog-to-digital converter (ADC) 610, a mixer 620, a combiner/divider 630, phase shifters 640-1 to 640-N, reception signal processing circuits 650-1 to 650-N, antenna elements 660-1 to 660-N, or a phase controller 690.

According to various embodiments of the disclosure, the phase controller 690 may be included in the processor 120 or the second communication processor 214 of FIG. 4. According to various embodiments of the disclosure, the DAC/ADC 610 may be included in the second communication processor 214 or fourth RFIC 228 of FIG. 4. According to various embodiments of the disclosure, the mixer 620 may be included in the fourth RFIC 228, and the combiner/divider 630 may be included in the fourth RFIC 228, and the combiner/divider 630 may be included in the fourth RFIC 228 or the third antenna module 246. According to various embodiments of the disclosure, the phase shifters 640-1 to 640-N and the reception signal processing circuits 650-1 to 650-N may be included in the third antenna module 246. The phase shifters 640-1 to 640-N may correspond to the phase shifters 413-1 to 413-4 of FIG. 4, and the antenna elements 660-1 to 660-N may correspond to the antenna elements 417-1 to 417-4 of FIG. 4.

According to various embodiments of the disclosure, the transmission (Tx) signal (e.g., an uplink signal) transmitted from the electronic device to the base station may be converted from a digital signal to analog signal via the DAC/ADC 610 and be mixed with a carrier frequency (t) and frequency-modulated by the mixer 620. The transmission signal modulated with the carrier frequency may be distributed in the number (e.g., N) of the antenna elements 660-1 to 660-N via the combiner/divider 630.

According to various embodiments of the disclosure, the transmission signal distributed via the combiner/divider 630 may be signal-processed and transmitted along the transmission path for each antenna element. For example, the signal to be transmitted to a first antenna element 660-1 may be phase-shifted via the first phase shifter 640-1 from the signal distributed by the combiner/divider 630, transmission signal-processed via a first transmission/reception signal processing circuit 650-1, and then transmission-processed via the first antenna element 660-1. The first transmission/reception signal processing circuit 650-1 may include a power amplifier (PA)/low noise amplifier (LNA) 651-1 and a transmission line (TL) 652-1. According to various embodiments of the disclosure, the signal phase-shifted via the first phase shifter 640-1 may be amplified into a preset magnitude of signal via the power amplifier (PA)/low noise amplifier (LNA) 651-1 and may then be transmitted to the first antenna element 660-1 via the TL 652-1.

According to various embodiments of the disclosure, the signal to be transmitted to the second antenna element 660-2 may be phase-shifted from the signal distributed by the combiner/divider 630 through the second phase shifter 640-2 and subjected to transmission signal processing through the second transmission/reception signal processing circuit 650-2 and then transmitted through the second antenna element 660-2. The second transmission/reception signal processing circuit 650-2 may include a power amplifier (PA)/low noise amplifier (LNA) 651-2 and a transmission line (TL) 652-2. According to various embodiments of the disclosure, the signal phase-shifted via the second phase shifter 640-2 may be amplified into a preset magnitude of signal via the power amplifier (PA)/low noise amplifier (LNA) 651-2 and may then be transmitted to the second antenna element 660-2 via the TL 652-2.

According to various embodiments of the disclosure, the signal to be transmitted to an Nth antenna element 660-N may be phase-shifted via the Nth phase shifter 640-N from the signal distributed by the combiner/divider 630, transmission signal-processed via an Nth transmission/reception signal processing circuit 650-N, and then transmission-processed via the Nth antenna element 660-N. The Nth transmission/reception signal processing circuit 650-N may include a power amplifier (PA)/low noise amplifier (LNA) 651-N and a transmission line (TL) 652-N. According to various embodiments of the disclosure, the signal phase-shifted via the Nth phase shifter 640-N may be amplified into a preset magnitude of signal via the power amplifier (PA)/low noise amplifier (LNA) 651-N and may then be transmitted to the Nth antenna element 660-N via the TL 652-N.

The first phase shifter 640-1 to the Nth phase shifter 640-N each may receive a phase shift-related signal from the phase controller 690 and convert the signal distributed by the combiner/divider 630 into a different phase value depending on the received control signal. The first phase shifter 640-1 to the Nth phase shifter 640-N may adjust the per-antenna element phase of the signals transmitted to the antenna elements 660-1 to 660-N, thereby maximizing the signal transmission/reception gain in the direction to be oriented.

According to various embodiments of the disclosure, 5G wireless communication systems may use multiple antenna-based beamforming technology to overcome high signal attenuation upon transmission and reception of signals on a mmWave frequency band (e.g., above 6 GHz) as shown in FIG. 6. The beamforming technology may maximize the signal transmission/reception gain in the direction to be oriented, by adjusting the phase per antenna element 660-1 to 660-N. The electronic device may dynamically select the optimal beam depending on the current wireless channel context via beam management upon signal transmission/reception with a base station and use it for beamforming.

Figure 7:
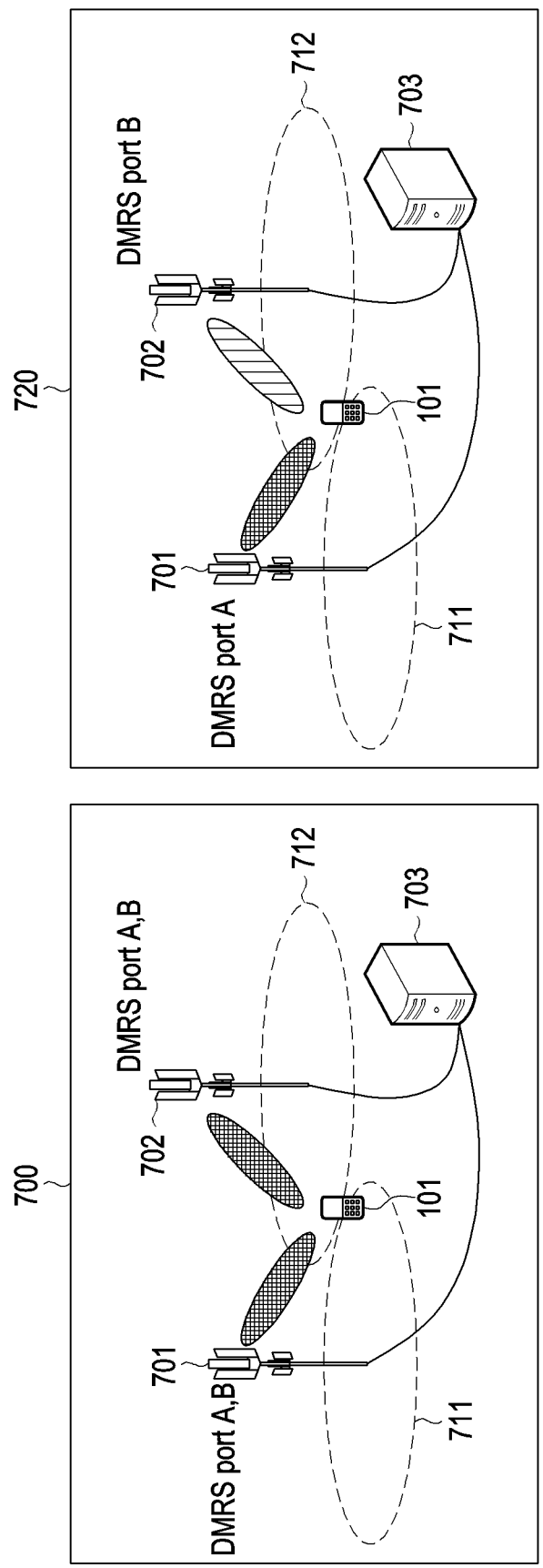
FIG. 7 is a view illustrating a concept of a cooperative communication system according to an embodiment of the disclosure.

FIG. 7 is a view illustrating a concept of a cooperative communication system according to an embodiment of the disclosure. FIG. 7 illustrates an example of a joint transmission (JT) (e.g., coherent joint transmission (C-JT) or non-coherent joint transmission (NC-JT)) method in a cooperative communication system (e.g., coordinated multi joint (CoMP)) and an example of allocating a radio resource per TRP according to the context.

Referring to FIG. 7, element 700 is a view illustrating coherent joint transmission (C-JT) supporting coherent precoding between cells, TRPs and/or beams, according to various embodiments. In C-JT, the same data (e.g., physical downlink shared channel (PDSCH) data) is transmitted from transmission reception point (TRP) A 701 ('first TRP') and TRP B 702 ('second TRP'), and joint precoding may be performed in multiple TRPs. The coverage 711 of TRP A 701 and the coverage 712 of TRP B 702 may be different from, the same as, or partially overlap each other. TRP A 701 and TRP B 702 may be connected to a base station device 703 (e.g., a digital unit (DU)). FIG. 7 may mean that TRP A 701 and TRP B 702 transmit the same demodulation reference signal (DMRS) ports (e.g., both the TRPs transmit DMRS ports A and B) to transmit the same PDSCH data. In this case, the electronic device 101 may receive one piece of downlink control information (DCI) to receive one PDSCH data demodulated based on the DMRSs transmitted through DMRS ports A and B.

Element 720 of FIG. 7 is a view illustrating non-coherent joint transmission (NC-JT) supporting non-coherent precoding between cells, TRPs and/or beams. In the case of NC-JT, different PDSCH data are transmitted in each cell, TRP, and/or beam, and individual precoding may be applied to each PDSCH data. This may mean that TRP A 701 and TRP B 702 transmit different DMRS ports (e.g., DMRS port A in TRP A and DMRS port B in TRP B) for different PDSCH transmissions. In this case, the electronic device 101 may receive two types of DCI information for receiving PDSCH A which is demodulated based on the DMRS transmitted via DMRS port A and PDSCH B which is demodulated based on the DMRS transmitted via DMRS port B.

To support NC-JT simultaneously providing data to one electronic device 101 from two or more transmission points (e.g., TRPs), it may be needed to allocate PDSCHs which are transmitted from two (or more) different transmission points via single physical downlink control channel (PDCCH) data or to allocate PDSCHs which are transmitted from two (or more) transmission points via multiple PDCCHs. The electronic device 101 may obtain a quasi co-location (QCL) connection relationship between reference signals (e.g., synchronization sequences (SS)/physical broadcast channel (PBCH) block) or channel state information-reference signals (CSI-RSs) or channels based on L1/L2/L3 signaling and efficiently estimate large scale parameters of each reference signal or channel therethrough. For example, when the transmission point of an arbitrary reference signal or channel is different, the large scale parameters are difficult to share with each other. Thus, when performing cooperative transmission, the base station may simultaneously provide the electronic device 101 with quasi co-location (QCL) information about two or more transmission points through two or more transmission configuration indicator (TCI) states. If non-coherent joint transmission is supported via multiple PDCCHs (e.g., multiple DCIs), that is, if two or more PDCCHs allocate two or more PDSCHs to the same serving cell and the same bandwidth part at the same time, the two or more TCI states may be respectively allocated to PDSCHs or DMRS ports via the PDCCHs. On the other hand, if non-coherent joint transmission is supported via a single PDCCH (e.g., a single DC), that is, if one PDCCH allocates two or more PDSCHs to the same serving cell and the same bandwidth part at the same time by one PDCCH, the two or more TCI states may be allocated to the PDSCHs or DMRS ports via one PDCCH. In the following embodiments of the disclosure, for ease of description, the operation of transmitting control information via the PDCCH may be referred to as transmitting the PDCCH, and the operation of transmitting data via the PDSCH may be referred to as transmitting the PDSCH.

According to various embodiments of the disclosure, the electronic device 101 may determine the number of antenna ports used when transmitting the PDSCH through a table indicating the DMRS port. In the 3GPP standard document Rel-15-based antenna port indication method, DCI format 1_1 may be based on the index with a length of 4 bits to 6 bits indicated in the antenna port field in the DCI and the antenna port may be determined accordingly. The electronic device 101 may identify information about the number and index of DMRS ports for PDSCH, number of front-load symbols, and number of CDM groups based on the indicator (index) transmitted by the base station. The electronic device 101 may determine a dynamic change in beamforming direction based on information of the TCI field in DCI 1_1. If tci-PresentDCI is set to 'enabled' in the upper layer, the electronic device 101 may identify the TCI field of 3-bit information and determine the beam direction associated with the DL-RS and the activated TCI states in the scheduled component carrier or the DL BWP. Conversely, if the tci-PresentDCI field is set to 'disable', it may be regarded as no change in beam direction of beamforming.

According to various embodiments of the disclosure, the electronic device 101 supporting the 3GPP standard document Rel-15 may receive a PDSCH stream including a single or multiple quasi co-located (QCLed) layer based on TCI information and antenna port information in a single PDCCH. The electronic device 101 supporting the 3GPP standard document Rel-16 may receive the data transmitted from a plurality of base stations or multiple TRPs (multi-TRP), in the form of C-JT/NC-JT. To support the C-JT/NC-JT, the electronic device 101 may set a basic upper layer. For example, for setting the upper layer, the electronic device 101 may receive a C-JT/NC-JT-related parameter or setting value and may set corresponding values in the communication processor (e.g., the integrated communication processor 260 of FIG. 2B) based on the received parameter or setting value.

FIG. 8 is a view illustrating a MAC CE structure for TCI state activation of a UE-specific PDCCH according to an embodiment of the disclosure.

Referring to FIG. 8, element 800 illustrates a MAC CE structure for TCI state activation of a Rel-15 based UE-specific PDCCH. Further, 850 of FIG. 8 illustrates a MAC-CE structure for TCI state activation/deactivation of a Rel-15-based UE-specific PDSCH. The MAC CE of Rel-16 may be configured in the form of extending part of the MAC CE message of Rel-15.

Figure 9:
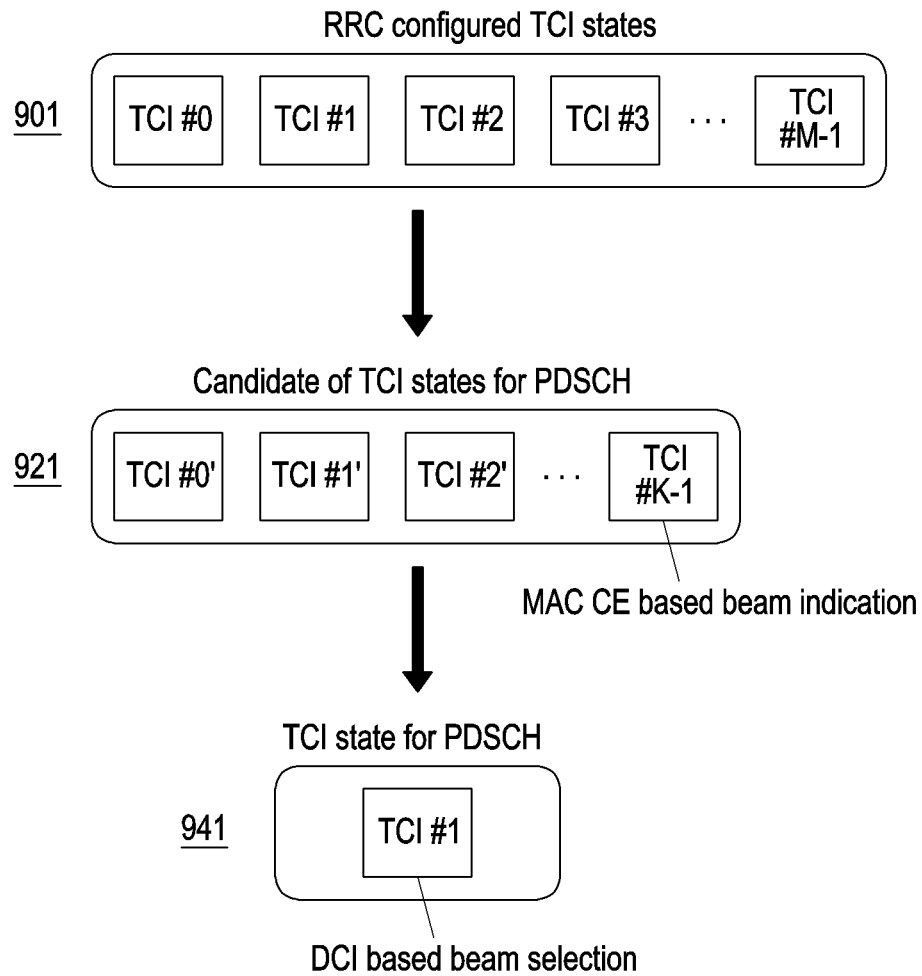
FIG. 9 is a view illustrating an example of TCI state setting and beamforming instruction, according to an embodiment of the disclosure.

FIG. 9 is a view illustrating a TCI state setting and beamforming instruction according to an embodiment of the disclosure.

Referring to FIG. 9, the base station may determine that all the TCI states of RRC configured TCI states 901 of Rel-15 as M TCI states, such as TCI #0, TCI #1, TCI #2, . . . , TCI #M−1 and select TCI #0', TCI #1', TCI #2', . . . , TCI #K−1 as a subset 921 of TCI states selected by the MAC CE of Rel-15 from among the M TCI states. As a comparative example, the base station and the electronic device 101 supporting Rel-16 may separately set the RRC configured TCI states supporting Rel-16 or use the RRC configured TCI states set in Rel-15 as it is. In this case, the RRC configured TCI states supporting Rel-16 may include some or all of the RRC configured TCI states set in Rel-15. The number of TCI states activated by the MAC CE messages of Rel-15 and Rel-16 may be set by the UE capability value reported to the base station by the electronic device 101.

According to various embodiments of the disclosure, as illustrated in FIG. 9, the base station and the electronic device 101 may determine that all the TCI states of RRC configured TCI states of Rel-15 as M TCI states, such as TCI #0, TCI #1, TCI #2, . . . , TCI #M−1 and select a subset 921 of the TCI states selected by the MAC CE of Rel-15 among them, and arrange TCI #0', TCI #1', TCI #2', . . . , TCI #K−1. If TCI #0 is selected from among the M TCI states, this may be placed on TCI #0'. Here, as an example, the maximum value of K for the base station and the electronic device 101 supporting Rel-15 may be set or determined to be 8, and the maximum value of K for the base station and electronic device 101 supporting Rel-16 may also be set to 8. If the maximum value is set to 8, the base station may instruct the electronic device 101 to select a beam for PDSCH via a DCI based beam selection operation in one CORESET. The selection of a beam may be determined by identifying the TCI field information 941 in the DCI among up to eight beams.

According to various embodiments of the disclosure, the electronic device 101 may report the time interval required to change the reception beam, by as many as set symbols (e.g., from a minimum of 7 symbols to a maximum of 28 symbols) based on a 60 kHz subcarrier spacing (SCS) to the base station through timeDurationForQCL or may report a time interval required to change the reception beam, by as many as set symbols (e.g., from a minimum of 14 symbols to a maximum of 28 symbols) based on a 120 kHz subcarrier spacing (SCS). 60 kHz and 120 kHz SCS may be set in FR2.

According to various embodiments of the disclosure, the Rel-15-based base station may allocate data considering a scheduling time offset (t_so) from the time when reception of the PDCCH in CORESET is completed to the time when the PDSCH scheduled by the PDCCH is transmitted. The scheduling time offset (t_so) may mean the time (or duration) from the last symbol (or the next symbol) of the PDCCH for allocating the PDSCH to the previous symbol where the PDSCH for transmitting data starts. The scheduling time offset (t_so) may determine the start symbol of the PDSCH based on the start and length indicator (SLIV) index set in startSymbolAndLength (0 to 127) of the PDSCH-TimeDomainResourceAllocation set in the higher layer. The application of the beamforming may be different depending on the capability of the electronic device 101. The capability may be transferred to the base station, as a timeDurationForQCL value, in the RRC setup process with the base station. For example, the timeDurationForQCL may be referred to as a time duration for the electronic device 10 to apply QCL or a QCL application time duration.

According to various embodiments of the disclosure, the electronic device 101 may perform the following operations according to the scheduling time offset (t_so) and the value of timeDurationForQCL based on the capability of the UE to be set in the higher layer. According to various embodiments of the disclosure, when the tci-PresentinDCI is not set to 'enabled' in the higher layer configuration, the electronic device 101 may identify whether the scheduling offset/scheduling timing offset between PDCCH and PDSCH is equal to or larger than the timeDurationForQCL reported via the capability report of the electronic device 101 (e.g., UE capability report) regardless of the DCI format. For example, when the scheduling offset/scheduling timing offset between PDCCH and PDSCH is smaller than the timeDurationForQCL, the electronic device 101 may determine the DMRS port of the received PDSCH based on the QCL parameter used in the CORESET associated with the monitored search space having the lowest CORESET ID in the latest slot. As another example, when the scheduling offset/scheduling timing offset between the PDCCH and the PDSCH is greater than or equal to timeDurationForQCL, the electronic device 101 may apply the QCL assumption indicated by the TCI field in the corresponding PDCCH (e.g., DCI) to the corresponding PDSCH DMRS port.

Figure 10:
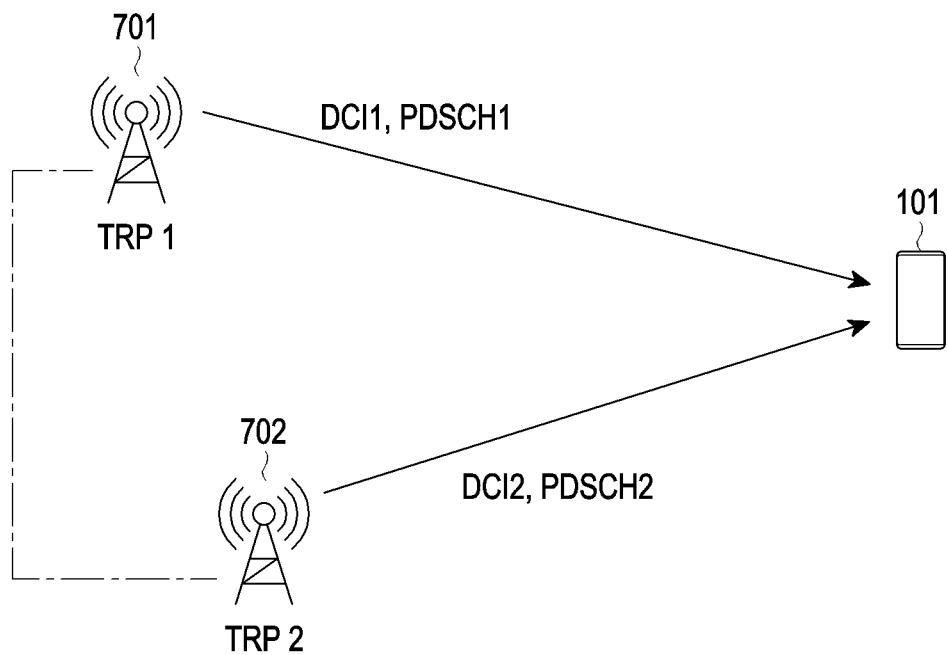
FIG. 10 is a view illustrating a concept of a multi-downlink control information (DCI)-based non-coherent joint transmission (NC-JT) system, according to an embodiment of the disclosure.
Figure 11:
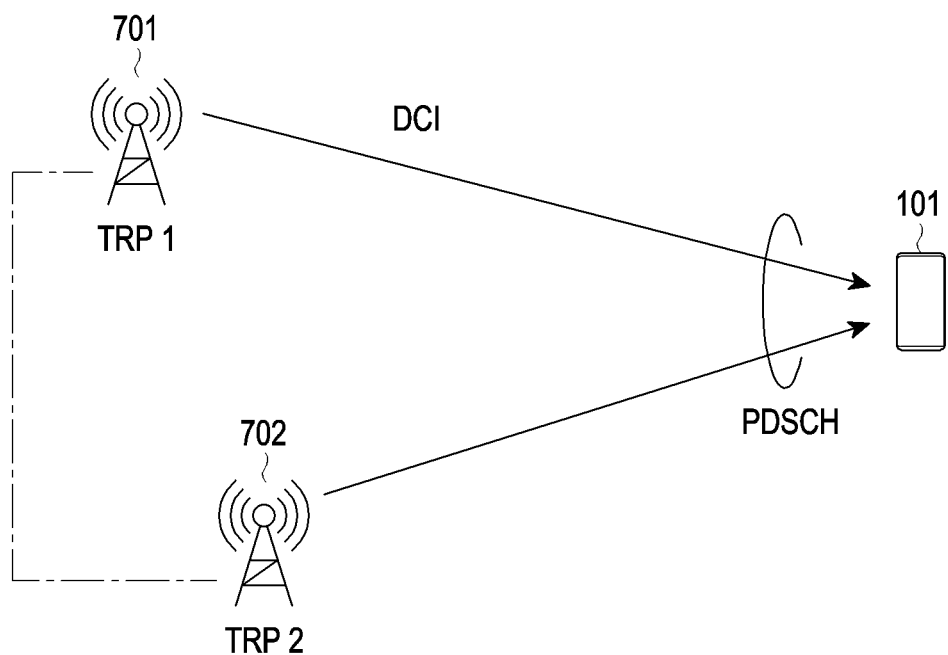
FIG. 11 is a view illustrating a concept of a single-DCI-based NC-JT system, according to an embodiment of the disclosure.

According to various embodiments of the disclosure, as described above, the 3GPP standard document Rel-16 includes an NC-JT system that simultaneously receives individual data from two TRPs. For example, the NC-JT system may include a multi-DCI based NC-JT (multi-DCI based NC-JT) that receives a PDCCH and a PDSCH from a plurality of TRPs, respectively, as shown in FIG. 10 and a single-DCI based NC-JT that is allocated a PDSCH from each TRP through the PDCCH (e.g., DCI) transmitted from one TRP as shown in FIG. 11. According to various embodiments of the disclosure, in the NC-JT system, to support reception of a plurality of PDSCHs, the TCI indication method may be extended to individually set a spatial relation for each TRP.

FIG. 10 is a view illustrating a concept of a multi-DCI-based NC-JT system, according to an embodiment of the disclosure.

Referring to FIG. 10, the electronic device 101 may receive a first PDCCH (e.g., a first DCI (DCI 1)) and a first PDSCH (PDSCH 1) from a first TRP 701 (TRP 1). The electronic device 101 may simultaneously receive a second PDCCH (e.g., a second DCI (DCI 2)) and a second PDSCH (PDSCH 2) from a second TRP 702 (TRP 2).

FIG. 11 is a view illustrating a concept of a single-DCI-based NC-JT system, according to an embodiment of the disclosure.

Referring to FIG. 11, the electronic device 101 may receive a PDCCH (e.g., DCI(DC)) from a first TRP 701 (TRP 1). The electronic device 101 may be allocated a first PDSCH transmitted from the first TRP 701 and a second PDSCH transmitted from the second TRP 702 through the PDCCH (e.g., DCI) received from the TRP 701.

Figure 12:
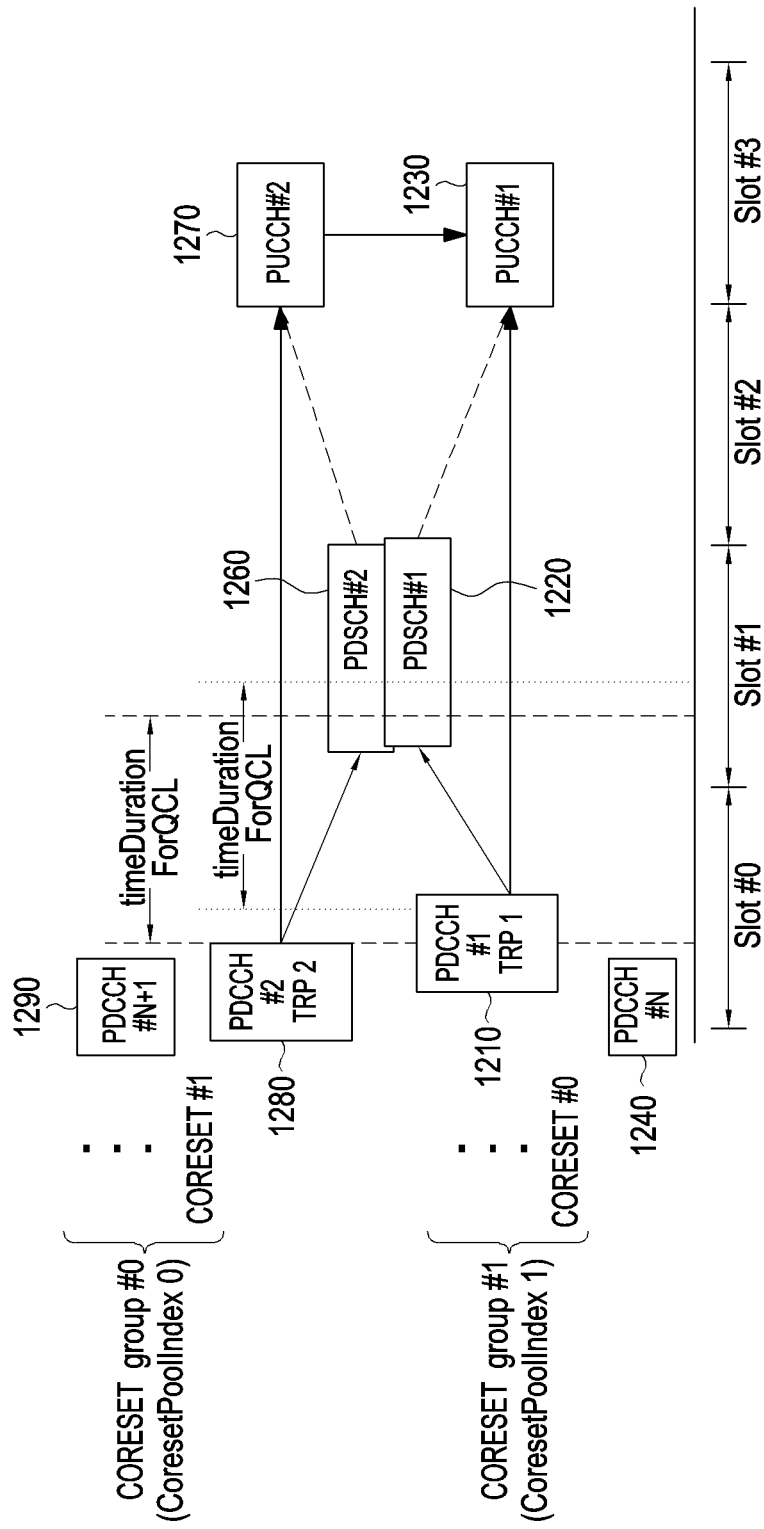
FIG. 12 is a view illustrating an example of multi-DCI-based NC-JT communication, according to an embodiment of the disclosure.

FIG. 12 is a view illustrating an example of multi-DCI-based NC-JT communication, according to an embodiment of the disclosure.

Referring to FIG. 12, the base station may transmit a first PDCCH in one CORESET (e.g., CORESET #0 or PDCCH #1) through the first TRP 701 and may additionally transmit a second PDCCH in another CORESET (e.g., CORESET #1 or PDCCH #2) through the second TRP 702. For example, the first PDCCH transmitted in the first TRP (TRP 1) may schedule one or more PUCCH resources (first PUCCH) and one or more PDSCHs (first PDSCH), and the second PDCCH transmitted in second TRP (TRP 2) may schedule one or more PUCCH resources (second PUCCH) and one or more PDSCHs (second PDSCH). The DMRS ports in different CDM groups may be respectively applied to the plurality of PDSCHs transmitted from the base station, and the DMRS transmission symbol transmitted along with each PDSCH may be positioned in the same symbol.

According to various embodiments of the disclosure, the plurality of CORESETs may be separately configured for multi-DCI-based NC-JT transmission. For example, the plurality of CORESETs may be configured in the form of a set, like a CORESET group, and may be indicated via L1/L2 signaling or higher layer for UEs supporting NC-JT. According to various embodiments of the disclosure, the CORESET group may correspond to the "'coresetPoolIndex" parameter described in the 3GPP standard document. For example, each CORESET group may be identified by the value corresponding to the "coresetPoolIndex". According to various embodiments of the disclosure, "0" in the "coresetPoolIndex" may indicate CORESET group #0, and "1" in the "coresetPoolIndex" may indicate CORESET group #1. According to various embodiments of the disclosure, CORESET group #0 may correspond to the first TRP (TRP 1), and CORESET group #1 may correspond to the second TRP (TRP 2). For example, if 0 is set in coresetPoolIndex included in the RRC message, at least one CORESET (e.g., CORESET #0) may be allocated among the plurality of CORESETs (e.g., CORESET #0 to CORESET #4) included in CORESET group #0, corresponding to the first TRP. Further, if 1 is set in coresetPoolIndex included in the RRC message, at least one CORESET (e.g., CORESET #1) may be allocated among the plurality of CORESETs (e.g., CORESET #0 to CORESET #4) included in CORESET group #1, corresponding to the second TRP.

According to various embodiments of the disclosure, the base station may configure a plurality of CORESET groups including at least one or more CORESETs to a specific electronic device 101 for multi-DCI-based NC-JT-based transmission. For example, the base station may configure two CORESET groups corresponding to two TRPs to the specific electronic device 101 (e.g., configure by the coresetPoolIndex in the RRC message) and configure at least one CORESET among the plurality of CORESETs (e.g., four CORESETs) included in each CORESET group. The electronic device 101 may monitor the configured CORESETs to receive two PDCCHs and receive PDSCHs allocated from the received PDCCHs.

According to various embodiments of the disclosure, as shown in FIG. 12, a plurality of CORESET groups (e.g., "coresetPoolIndex" described in the 3GPP standard document) (e.g., CORESET group #0 and CORESET group #1) may be configured to the specific electronic device 101 from the base station and, among up to five CORESETs (e.g., CORESET #0 to CORESET #4) included in each CORESET group, the electronic device 101 may monitor CORESET #0 of CORESET group #0 for the first TRP and monitor CORESET #1 of CORESET group #1 for the second TRP for the purpose of NC-JT. According to various embodiments, the CORESET to be monitored by the electronic device 101 in the CORESET group may be set by the base station or be determined arbitrarily or according to the setting of the electronic device 101.

According to various embodiments of the disclosure, the base station may configure at least two or more CORESET groups including at least one or more CORESETs to the specific electronic device 101 for multi-DCI-based NC-JT-based transmission. For example, the base station may configure two CORESET groups to the specific electronic device 101 and configure or indicate one CORESET group among the configured CORESET groups or CORESET(s) in each CORESET group. The electronic device 101 may monitor the configured CORESETs to receive two PDCCHs and receive PDSCHs allocated from the received PDCCHs. As illustrated in FIG. 12, two CORESET groups (e.g., CORESET group #0 and CORESET group #1) may be configured to the specific electronic device 101 from the base station and, among the CORESETs in the CORESET groups, the electronic device 101 may monitor CORESET #0 in CORESET group #0 and CORESET #1 in CORESET group #1 for NC-JT purposes. The CORESET to be monitored by the electronic device 101 in the CORESET group may be set by the base station or be determined arbitrarily or according to the setting of the electronic device 101.

According to various embodiments of the disclosure, CORESET #0 may include a first PDCCH (PDCCH #1) 1210 and an Nth PDCCH (PDCCH #N) 1240, and CORESET #1 may include a second PDCCH (PDCCH #2) 1280 and an N+1th PDCCH (PDCCH #N+1) 1290. The CORESETs configured for each CORESET group may be different (e.g., CORESET group #0 may include CORESET #0 and #2, and CORESET group #1 may include CORESET #1, #3, and #5), and the sum of the numbers of the CORESETs configured in all the CORESET groups may be within the maximum number of CORESETs that may be configured in the electronic device 101 (e.g., reported in a UE capability). The base station may apply the same PDCCH beam direction for the PDCCH beam direction (TCI-states) in a specific CORESET transmitted by the base station for the specific electronic device 101 unless separately updated by the MAC CE.

According to various embodiments of the disclosure, the first PDCCH 1210 may indicate allocation of each of the first PDSCH 1220 and the first PUCCH 1230 for NC-JT transmission. The second PDCCH 1280 may indicate allocation of each of the second PDSCH 1260 and the second PUCCH 1270 for NC-JT transmission. For example, the first PDCCH 1210 and the second PDCCH 1280 may be transmitted in slot #0. The first PDSCH 1220 and the second PDSCH 1260 may be transmitted in slot #1. The first PUCCH 1230 and the second PUCCH 1270 may be transmitted in slot #3. According to various embodiments of the disclosure, the beamforming direction of the PDSCHs 1220 and 1260 may be varied depending on the beamforming information set in a higher layer, the TCI information about DCI in the first PDCCH 1210 and the second PDCCH 1280, antenna port information, or radio network temporary identifier (RNTI) information. The electronic device 101 may identify the beamforming direction changed by the base station based on the received beamforming information and DCI information. According to various embodiments of the disclosure, the beamforming direction of the first PDCCH 1210 may be different from the beamforming direction of the first PDSCH 1220 for NC-JT transmission, and the beamforming direction of the second PDCCH 1280 may be different from the beamforming direction of the second PDSCH 1260 for NC-JT transmission. As another example, the beamforming direction of the first PDCCH 1210 may be identical to the beamforming direction of the first PDSCH 1220 for NC-JT transmission. The beamforming direction of the second PDCCH 1280 may be identical to the beamforming direction of the second PDSCH 1260 for NC-JT transmission. For example, the base station may set the beamforming directions of the first PDSCH 1220 and the second PDSCH 1260 to be different from each other considering a spatial beamforming gain.

Figure 13:
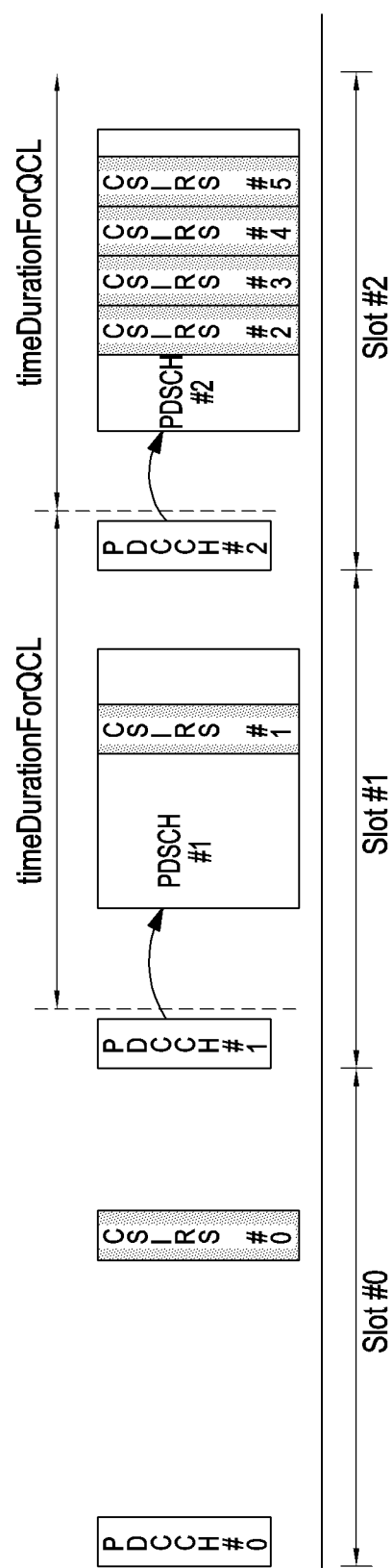
FIG. 13 is a view illustrating a PDSCH reception method based on NC-JT transmission, according to an embodiment of the disclosure.

FIG. 13 is a view illustrating a PDSCH reception method based on NC-JT transmission, according to an embodiment of the disclosure.

Referring to FIG. 13, element 1300 illustrates that the electronic device 101 may receive a PDSCH based on NC-JT transmission. In the following embodiments of the disclosure, default QCL may be assumed. According to the UE feature of the electronic device 101, the electronic device 101 having a maxNumberActiveTCI-PerBWP of 1 may report related UE capability information to the base station. The electronic device 101 may support one active TCI state for each CC and each BWP. The electronic device 101 may track one active TCI state for receiving the PDCCH and the PDSCH.

According to various embodiments of the disclosure, CSI-RS(s) for the purpose of radio link management (RLM) may be configured in slot #0, CSI-RS(s) for beam management may be configured in slot #1, and CSI-RS(s) for beam failure detection or CSI-RS(s) for tracking may be configured in slot #2. The electronic device 101 may measure the channel by receiving the periodic CSI-RS, SPS CSI-RS, and aperiodic CSI-RS.

According to various embodiments of the disclosure, if beam switching on the first PDCCH is indicated to the electronic device 101, and the scheduled first PDSCH and the first CSI-RS for channel measurement overlap on the same OFDM symbol as shown in FIG. 13, the electronic device 101 may encounter an occasion where the default QCL-based default PDSCH beam conflicts with the CSI-RS QCL type-D assumption set in the RRC. In this case, if the start time of the PDSCH is positioned before the timeDurationForQCL-based time, the electronic device 101 may receive the PDSCH based on the configured default QCL so as to receive the PDSCH allocated from the PDCCH indicating beam switching, considering the set timeDurationForQCL value (e.g., 7, 14, or 28 symbols in the case of SCS 60 kHz or 14 or 28 kHz in the case of SCS 120 kHz).

Figure 14:
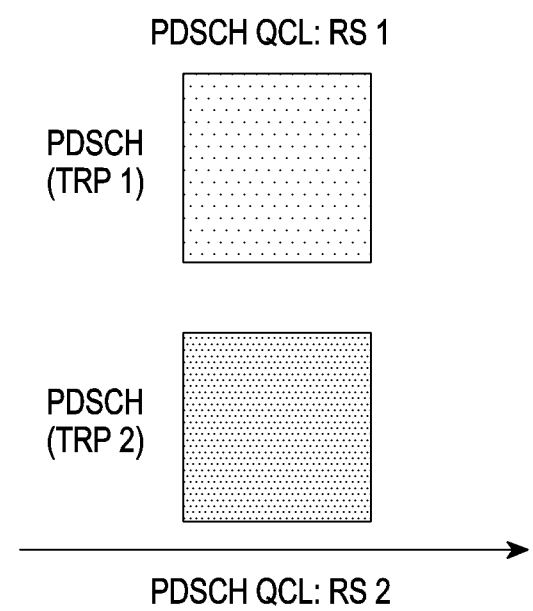
FIG. 14 is a view illustrating an example of receiving PDSCH based on NC-JT transmission, according to an embodiment of the disclosure.

FIG. 14 is a view illustrating an example of receiving PDSCH based on NC-JT transmission, according to an embodiment of the disclosure.

Referring to FIG. 14, as described above, the electronic device 101 may receive the first PDSCH transmitted from the first TRP 701 (TRP 1) and the second PDSCH transmitted from the second TRP 702 (TRP 2) according to the NC-JT configuration. The first PDSCH and the second PDSCH may be transmitted at the times at least partially overlapping each other. The electronic device 101 may simultaneously receive the first PDSCH transmitted from the first TRP 701 (TRP 1) and the second PDSCH transmitted from the second TRP 702 (TRP 2).

According to various embodiments of the disclosure, the first PDSCH transmitted from the first TRP 701 may be received based on a first reference signal (reference signal 1 (RS 1)) (e.g., first CSI-RS) having a QCLed relationship with the first PDSCH. For example, the electronic device 101 may set the antenna module and the optimal reception beam based on the reception signal strength of the first reference signal having a QCLed relationship with the first PDSCH and may receive the first PDSCH based on the set optimal reception beam through the set antenna module. The second PDSCH transmitted from the second TRP 702 may be received based on a second reference signal (reference signal 2 (RS 2)) (e.g., second CSI-RS) having a QCLed relationship with the second PDSCH. For example, the electronic device 101 may set the antenna module and the optimal reception beam based on the reception signal strength of the second reference signal having a QCLed relationship with the second PDSCH and may receive the first PDSCH based on the set optimal reception beam through the set antenna module.

Figure 15:
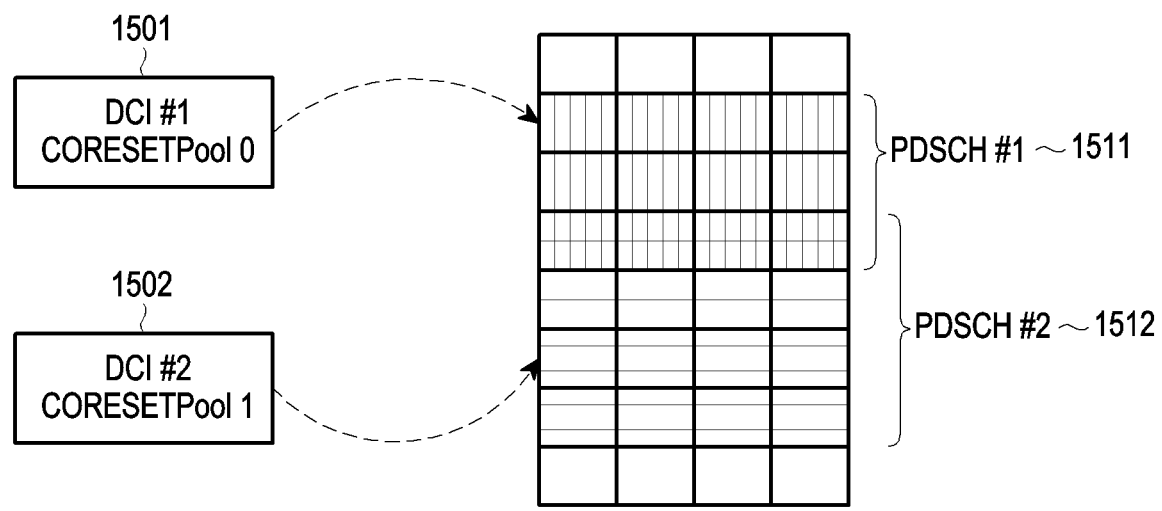
FIG. 15 is a view illustrating an example of resource allocation based on NC-JT transmission, according to an embodiment of the disclosure.

FIG. 15 is a view illustrating an example of resource allocation based on NC-JT transmission, according to an embodiment of the disclosure.

Referring to FIG. 15, as described above, the first DCI (DCI #1) 1501 included in the first PDCCH transmitted from the first TRP 701 may include information corresponding to the resource (e.g., resource block (RB)) allocated in the time-frequency domain for the first PDSCH (PDSCH #1) 1511 to be received by the electronic device 101. The second DCI (DCI #2) 1502 included in the second PDCCH transmitted from the second TRP 702 may include information corresponding to the resource allocated in the time-frequency domain for the second PDSCH (PDSCH #2) 1512 to be received by the electronic device 101.

Figure 16:
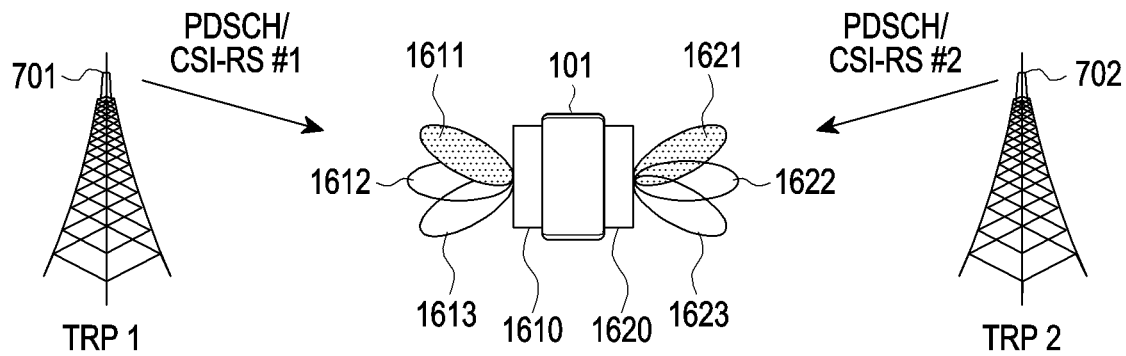
FIG. 16 is a view illustrating reception beam selection in an NC-JT system, according to an embodiment of the disclosure.

According to various embodiments of the disclosure, the first PDSCH 1511 transmitted from the first TRP 701 and the second PDSCH 1512 transmitted from the second TRP 702 may at least partially overlap each other in the time-frequency domain. For example, when the electronic device 101 supports multi-DCI-based NC-JT, the electronic device 101 may transmit a UE capability message of Table 1 below to the base station.

first antenna module 1610 and a second antenna module 1620 as shown in FIG. 16 but, according to various embodiments of the disclosure, the electronic device 101 may include three or more antenna modules. For example, the first antenna module 1610 may be disposed in a first portion of the electronic device 101, and the second antenna module 1620 may be disposed in a second portion of the electronic device 101. According to various embodiments of the disclosure, the first antenna module 1610 and the second antenna module 1620 may be oriented in different directions, but are not limited thereto. For example, as shown in FIG. 16, the electronic device 101 may receive signals in all directions through the two antenna modules 1610 and 1620 mounted on both sides thereof. Although FIG. 16 illustrates that the antenna modules 1610 and 1620 are disposed outside the electronic device 101, the antenna modules 1610 and 1620 may be disposed outside or inside the housing of the electronic device 101.

According to various embodiments of the disclosure, the electronic device 101 may set a plurality of reception beams corresponding to the first antenna module 1610. For example, the electronic device 101 may set a 1-1th reception beam 1611, a 1-2th reception beam 1612, and a 1-3th reception beam 1613 corresponding to the first antenna module 1610. The electronic device 101 may set a plurality of reception beams corresponding to the second antenna module 1620. For example, the electronic device 101 may set a 2-1th reception beam 1621, a 2-2th reception beam 1622, and a 2-3th reception beam 1623 corresponding to the second antenna module 1620. FIG. 16 and the following embodiments exemplify that three reception beams are set for each antenna module 1610 and 1620, but this is for convenience of description, and two or four or more reception beams may be set for each antenna module 1610 and 1620.

According to various embodiments of the disclosure, the electronic device 101 may receive a first PDSCH from a first TRP 701 and a second PDSCH from a second TRP 702. For example, the electronic device 101 may set an optimal reception beam for receiving the first PDSCH based on the reception signal strength of the first reference signal (e.g., first CSI-RS) having a QCLed relationship with the first PDSCH. In FIG. 16, it may be assumed that a 1-1th reception beam 1611 corresponding to the first antenna module 1610 is set as the optimal reception beam for receiving the first PDSCH. The electronic device 101 may

TABLE 1

```
multiDCI-multiTRP-Parameters-r16            SEQUENCE {
    -- R1 16-2a-0: Overlapping PDSCHs in time and fully overlapping in frequency and time
    overlapPDSCHsFullyFreqTime-r16          INTEGER (1..2)              OPTIONAL,
    -- R1 16-2a-1: Overlapping PDSCHs in time and partially overlapping in frequency and time
    overlapPDSCHsInTimePartiallyFreq-r16    ENUMERATED {supported}      OPTIONAL,
    -- R1 16-2a-2: Out of order operation for DL
    outOfOrderOperationDL-r16               SEQUENCE {
        supportPDCCH-ToPDSCH-r16            ENUMERATED {supported}      OPTIONAL,
        supportPDSCH-ToHARQ-ACK-r16         ENUMERATED {supported}      OPTIONAL
    }
}
```

FIG. 16 is a view illustrating reception beam selection in an NC-JT system, according to an embodiment of the disclosure.

Referring to FIG. 16, the electronic device 101 may include a plurality of antenna modules (e.g., the third antenna module 246 of FIG. 4). In the following description, for convenience of description, it is illustrated that the electronic device 101 includes two antenna modules, e.g., a set an optimal reception beam for receiving the second PDSCH based on the reception signal strength of the second reference signal (e.g., second CSI-RS) having a QCLed relationship with the second PDSCH. In FIG. 16, it may be assumed that a 2-1th reception beam 1621 corresponding to the second antenna module 1620 is set as the optimal reception beam for receiving the first PDSCH. According to various embodiments of the disclosure, as a method for setting the optimal reception beam, the electronic device 101 may compare signal to interference plus noise ratios (SINRs) of the reception beams with that of the reference signal (e.g., CSI-RS) and determine the reception beam having the largest SINR as the optimal reception beam.

Figure 17:
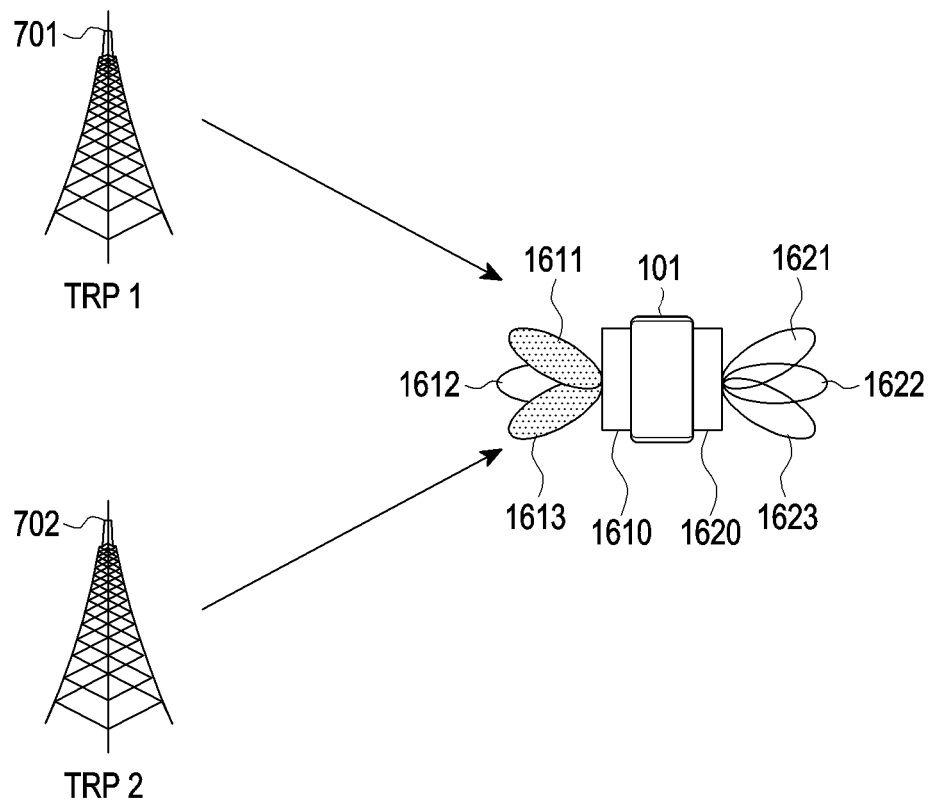
FIG. 17 is a view illustrating reception beam selection in an NC-JT system, according to an embodiment of the disclosure.

FIG. 17 is a view illustrating reception beam selection in an NC-JT system, according to an embodiment of the disclosure.

Referring to FIG. 17, the electronic device 101 may include a plurality of antenna modules (e.g., the third antenna module 246 of FIG. 4).

According to various embodiments of the disclosure, the electronic device 101 may set a plurality of reception beams corresponding to the first antenna module 1610. For example, the electronic device 101 may set a 1-1th reception beam 1611, a 1-2th reception beam 1612, and a 1-3th reception beam 1613 corresponding to the first antenna module 1610. The electronic device 101 may set a plurality of reception beams corresponding to the second antenna module 1620. For example, the electronic device 101 may set a 2-1th reception beam 1621, a 2-2th reception beam 1622, and a 2-3th reception beam 1623 corresponding to the second antenna module 1620.

According to various embodiments of the disclosure, the electronic device 101 may receive a first PDSCH from a first TRP 701 and a second PDSCH from a second TRP 702. For example, the electronic device 101 may set an optimal reception beam for receiving the first PDSCH based on the reception signal strength of the first reference signal (e.g., first CSI-RS) having a QCLed relationship with the first PDSCH. In FIG. 17, it may be assumed that a 1-1th reception beam 1611 corresponding to the first antenna module 1610 is set as the optimal reception beam for receiving the first PDSCH. The electronic device 101 may set an optimal reception beam for receiving the second PDSCH based on the reception signal strength of the second reference signal (e.g., second CSI-RS) having a QCLed relationship with the second PDSCH. In FIG. 17, it may be assumed that a 1-3th reception beam 1613 corresponding to the first antenna module 1610 is set as the optimal reception beam for receiving the first PDSCH. According to various embodiments of the disclosure, as a method for setting the optimal reception beam, the electronic device 101 may compare signal to interference plus noise ratios (SINRs) of the reception beams with that of the reference signal (e.g., a CSI-RS) and determine the reception beam having the largest SINR as the optimal reception beam.

According to various embodiments of the disclosure, when the optimal reception beam corresponding to the signal (e.g., first PDCCH or first PDSCH) transmitted from the first TRP 701 and the optimal reception beam corresponding to the signal (e.g., second PDCCH or second PDSCH) transmitted from the second TRP 702 are different reception beams (e.g., 1-1th reception beam 1611 and 1-3th reception beam 1613) corresponding to the same antenna module (e.g., the first antenna module 1610) as shown in FIG. 17, the electronic device 101 may select any one reception beam as the optimal reception beam. For example, when the reception signal strength for each reception beam for each antenna module is determined as shown in Table 2 below, optimal reception beams corresponding to the plurality of TRPs in the first antenna module may be determined.

TABLE 2

| TRP | Rx Beam | first antenna module | second antenna module |
|---|---|---|---|
| RS 1 (TRP 1) | Rx Beam 0 | 15 dB | 1 dB |
| | Rx Beam 1 | 14 dB | 0.5 dB |
| | Rx Beam 2 | 10 dB | 0.2 dB |
| | Rx Beam 3 | 5 dB | 0.1 dB |
| | Rx Beam 4 | 8 dB | 0.3 dB |
| | Rx Beam 5 | 12 dB | 0.4 dB |
| | Rx Beam 6 | 13 dB | 0.8 dB |
| RS 2 (TRP 2) | Rx Beam 0 | 14 dB | 0.8 dB |
| | Rx Beam 1 | 15 dB | 0.7 dB |
| | Rx Beam 2 | 10 dB | 0.4 dB |
| | Rx Beam 3 | 5 dB | 0.6 dB |
| | Rx Beam 4 | 6 dB | 0.7 dB |
| | Rx Beam 5 | 8 dB | 0.9 dB |
| | Rx Beam 6 | 12 dB | 1 dB |

As another method, the antenna module may be designed to be extended so that each antenna module simultaneously receives a plurality of beams. In this case, since components of the antenna module including a phase shifter or individual-antenna elements for beam forming are additionally required, the size of the antenna module may be increased. For example, since the length of the wavelength is 1 cm with respect to the 29 GHz band, which is the mmWave band, the size of the phase shifter that adjusts the phase by changing the length of the line needs to be changed as much as the size corresponding to the wavelength, and the antenna component also requires the interval corresponding to the half wavelength. Thus, an implementation for allowing the antenna module to simultaneously receive with a plurality of beams may increase the size of the antenna module. Accordingly, the antenna module of the electronic device 101 may receive only with a specific reception beam due to design limitations and may not apply two reception beams at the same time. According to various embodiments of the disclosure, when the electronic device 101 selects any one of the optimal reception beams for the TRP 701 and 702, the reception strength of the signal transmitted from the remaining TRP is relatively reduced, so that communication performance of the electronic device 101 may decrease. For example, if the number of reception beams used for measurement in the electronic device 101 increases, the time required for beam tracking increases. Therefore, the number of reception beams actually used by the electronic device 101 may be limited. By the characteristic of the FR2 band with strong directivity, the type of the reception beam used by the electronic device 101 may be configured as a narrow beam with strong directivity in a specific direction. As described above, in a case where only one reception beam is used in one antenna module due to design restrictions of the electronic device 101, as a narrow beam with strong directivity in the specific direction is used, the signal strength of another TRP in NC-JT may decrease.

In various embodiments of the disclosure described below, as illustrated in FIG. 17, when the optimal reception beams for receiving the signals from the TRPs 701 and 702 are set in the same antenna module, it is possible to enhance communication performance by changing the set reception beam.

Figure 18:
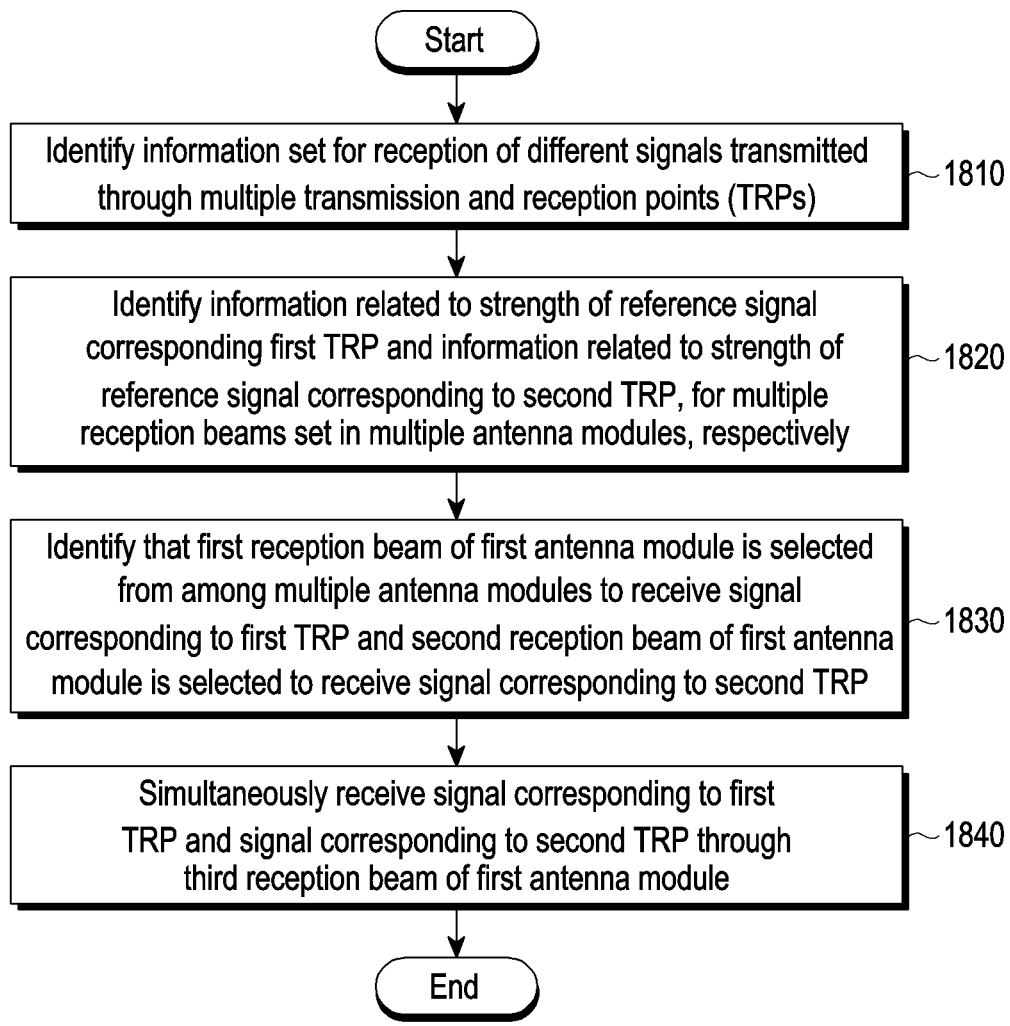
FIG. 18 is a flowchart illustrating an operation method of an electronic device according to an embodiment of the disclosure.

FIG. 18 is a flowchart illustrating an operation method of an electronic device according to an embodiment of the disclosure.

Referring to FIG. 18, according to various embodiments of the disclosure, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify information set for receiving different signals transmitted through a plurality of transmission and reception points (TRPs) in operation 1810.

According to various embodiments of the disclosure, whether the NC-JT operation of the electronic device 101 is set, or information configured to receive signals through the plurality of TRPs may be included in the RRC message. For example, in a case where multi-DCI-based NC-JT is set, if there are CORESETs having two different values (e.g., 0 or 1) with respect to the coresetPoolIndex set in each CORESET, it may mean that NC-JT may be used, and CORESETs with different coresetPoolIndex's may mean that they are transmitted from different TRPs. According to various embodiments of the disclosure, whether the NC-JT operation is set, or the information set to receive signals through the plurality of TRPs may be included in the RRC configuration message exemplified in Table 3 below.

TABLE 3

```
ControlResourceSet ::=                    SEQUENCE {
  controlResourceSetId                      ControlResourceSetId,
  frequencyDomainResources                    BIT STRING (SIZE (45)),
  duration                                INTEGER (1..maxCoReSetDuration),
  cce-REG-MappingType CHOICE {
    interleaved                             SEQUENCE {
      reg-BundleSize                          ENUMERATED {n2, n3, n6},
      interleaverSize                         ENUMERATED {n2, n3, n6},
      shiftIndex   INTEGER(0..maxNrofPhysicalResourceBlocks-1)
    },
    nonInterleaved                          NULL
  },,
  precoderGranularity ENUMERATED {sameAsREG-bundle, allContiguousRBs},
  tci-StatesPDCCH   SEQUENCE(SIZE (1..maxNrofTCI-StatesPDCCH)) OF TCI-StateId
  tci-PresentInDCI   ENUMERATED {enabled}
  pdcch-DMRS-ScramblingID BIT STRING (0..65535)
  ...,
  [[
  rb-Offset-r16                           INTEGER (0..5)
  tci-PresentDCI-1-2-r16                  INTEGER (1..3)
  coresetPoolIndex-r16                    INTEGER (0..1)
  controlResourceSetId-v1610                ControlResourceSetId-v1610
  ]]
}
```

Referring to Table 3 above, a plurality of CORESETs may be set in the RRC configuration message. Each CORESET may be divided on a per-group basis by the value set in the coresetPoolIndex-r16 of the ControlResourceSet item. In Table 2 above, the CORESETs having different coresetPoolIndexes may mean that they are transmitted from different TRPs, and may mean that the PDSCH scheduled by the PDCCH transmitted in each CORESET is also transmitted from the same TRP.

According to various embodiments of the disclosure, in the case of single-DCI-based NC-JT, it is possible to identify the setting of the NC-JT operation that may be currently used through the repetitionSchemeConfig item of the PDSCH-ConFIG. Detailed items of the repetitionSchemeConfig may be set as shown in Table 4 below.

TABLE 4

```
RepetitionschemeConfig-r16 ::= CHOICE {
   fdm-TDM-r16                    SetupRelease { FDM-TDM-r16 },
   slotBased-r16                  SetupRelease { SlotBased-r16 }
}
RepetitionSchemeConfig-v1630 ::=           SEQUENCE {
   slotBased-v1630                SetupRelease { SlotBased-v1630}
}
FDM-TDM-r16 ::=                            SEQUENCE {
   repetitionscheme-r16              ENUMERATED {fdmSchemeA,
fdmSchemeB, tdmSchemeA },
   startingSymbolOffsetK-r16               INTEGER (0..7)
}
SlotBased-r16 ::=                      SEQUENCE {
   tciMapping-r16
   repetitionscheme-r16            ENUMERATED {cyclicMapping,
sequentialMapping},
   sequenceOffsetForRV-r16                 INTEGER (1..3)
}
```

According to various embodiments of the disclosure, in operation 1820, the electronic device 101 may identify information related to the strength of the reception signal corresponding to the first TRP and information related to the strength of the reference signal corresponding to the second TRP, for a plurality of reception beams respectively set in the plurality of antenna modules. For example, when NC-JT is set as exemplified in Table 3 and Table 4, the base station may inform the electronic device 101 of the reference signal (e.g., CSI-RS) that may be referenced by the electronic device 101 for each TRP, and the electronic device 101 may select an optimal reception beam for each TRP based on the reference signal. For example, as described above, the electronic device 101 may select or set the reception beam having the largest SINR of the reference signal as an optimal reception beam.

According to various embodiments of the disclosure, in operation 1830, the electronic device 101 may identify that the first reception beam of the first antenna module among the plurality of antenna modules is selected to receive the signal corresponding to the first TRP, and the second reception beam of the first antenna module is selected to receive the signal corresponding to the second TRP. For example, as described in connection with FIG. 17, in the electronic device 101, the 1-1th reception beam 1611 set corresponding to the first antenna module 1610 may be selected to receive the signal corresponding to the first TRP, and the 1-3th reception beam 1613 corresponding to the first antenna module 1610 may be selected to receive the signal corresponding to the second TRP.

According to various embodiments of the disclosure, upon identifying that signals corresponding to the plurality of TRPs are received through the same antenna module in operation 1830, the electronic device 101 may simultaneously receive the signal corresponding to the first TRP and the signal corresponding to the second TRP through the third reception beam (e.g., the 1-4th reception beam) of the first antenna module in operation 1840. According to various embodiments of the disclosure, the third reception beam may be different from the 1-1th reception beam 1611 or the 1-3th reception beam 1613. For example, the third reception beam may correspond to a wide beam having a relatively wider beam width than the 1-1th reception beam 1611 or the 1-3th reception beam 1613.

Figure 19:
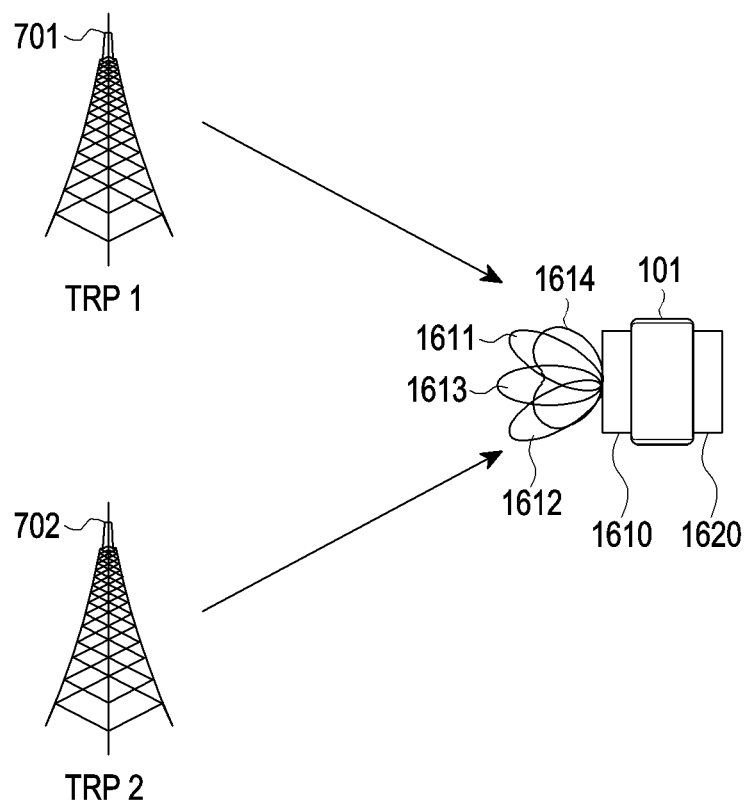
FIG. 19 is a view illustrating reception beam selection in an NC-JT system, according to an embodiment of the disclosure.

FIG. 19 is a view illustrating reception beam selection in an NC-JT system, according to an embodiment of the disclosure.

Referring to FIG. 19, upon identifying that signals corresponding to the plurality of TRPs are received through the same antenna module (e.g., the first antenna module 1610) as described above in connection with FIG. 18, the electronic device 101 may simultaneously receive the signal corresponding to the first TRP and the signal corresponding to the second TRP through the 1-4th reception beam 1614, as the third reception beam of the first antenna module. For example, as shown in FIG. 19, the third reception beam (the 1-4th reception beam 1614) may correspond to a wide beam having a relatively wider beam width than the 1-1th reception beam 1611 or the 1-3th reception beam 1613.

In the following description, methods for determining the third reception beam by the electronic device 101 are described, according to various embodiments of the disclosure.

According to various embodiments of the disclosure, when the PDCCHs transmitted from each TRP temporally overlap, the electronic device 101 may determine the reception beam considering reference signals (e.g., two CSI-RSs) connected, via the QCL, with the PDCCH for each TRP. For convenience of description, it may be assumed that the reference signal connected, via the QCL, with the PDCCH transmitted from the first TRP 701 is X, and the reference signal connected, via the QCL, with the PDCCH transmitted from the second TRP 702 is Y. It may be assumed that the SINR when the electronic device 101 receives X through the reception beam i is SINR(i,X), and the SINR when the electronic device 101 receives Y through the reception beam i is SINR(i,Y). According to various embodiments of the disclosure, the electronic device 101 may calculate the probability of receiving all of the PDCCHs transmitted from each TRP when the reception beam i is used from SINR(i,X) and SINR(i,Y) and may set the beam i for maximizing it as the third receive beam. The electronic device 101 may simultaneously receive the PDCCH transmitted from the first TRP 701 and the PDCCH transmitted from the second TRP 702 based on the set third reception beam, increasing the probability of receiving all of the PDCCHs. For example, the probability of receiving all of the PDCCHs transmitted from each TRP may be determined through the mapping table of Table 5 and Equation 1. For example, the SINR and block error rate (BLER) of each reference signal may be stored in a table form as shown in Table 5 below.

TABLE 5

| SINR(dB) | BLER |
|---|---|
| −5 or less | 0.1 |
| −5 to −4.5 | 0.05 |
| ... | ... |
| 23.5 ~ 24 | 0.001 |
| 24 or more | 0.00001 |

$$\text{PDCCH reception probability} = (1 - \text{BLER\_1}) \times (1 - \text{BLER\_2}) \quad \text{Equation 1}$$

In Equation 1, BLER_1 denotes the estimated BLER for the first PDCCH transmitted from the first TRP 701, and BLER_2 denotes the estimated BLER for the second PDCCH transmitted from the second TRP 702. The electronic device 101 may calculate the PDCCH reception probability for a plurality of reception beams set in the first antenna module 1610 based on Equation 1 above and may set the reception beam having the highest PDCCH reception probability as the third reception beam. For example, in the TRP having a low SINR, the probability of receiving the PDCCH is low, so that the probability of receiving the PDCCHs from both sides may be reduced. Setting a reception beam based on Equation 1 above allows SINRs to be formed to be evenly high in the plurality of TRPs and may thus be advantageous in receiving all of the plurality of PDCCHs.

According to various embodiments of the disclosure, Table 6 below describes an example of determining the third reception beam through the SINR actually measured by the electronic device 101.

TABLE 6

| SINR | first reference signal (first CSI-RS) | second reference signal (second CSI-RS) | estimated BLER |
|---|---|---|---|
| 1-1 th reception beam | 15 dB | 3 dB | 5% |
| 1-2 th reception beam | 7 dB | 7 dB | 5% |

TABLE 6-continued

| SINR | first reference signal (first CSI-RS) | second reference signal (second CSI-RS) | estimated BLER |
|---|---|---|---|
| 1-3 th reception beam | 3 dB | 15 dB | 3% |
| 1-4 th reception beam | 10 dB | 10 dB | 1% |

Referring to Table 6, the 1-1th reception beam may be set as an optimal reception beam for receiving the first PDCCH transmitted from the first TRP 701, and the 1-3th reception beam may be set as an optimal reception beam to receive the second PDCCH transmitted from the second TRP 702. However, in a case where the first PDCCH and the second PDCCH are simultaneously received, one first antenna module 1610 may not simultaneously form the 1-1th reception beam 1611 and the 1-3th reception beam 1613. Therefore, according to various embodiments of the disclosure, it is possible to increase the probability of receiving the PDCCH by forming the 1-4th reception beam 1614.

Figure 20:
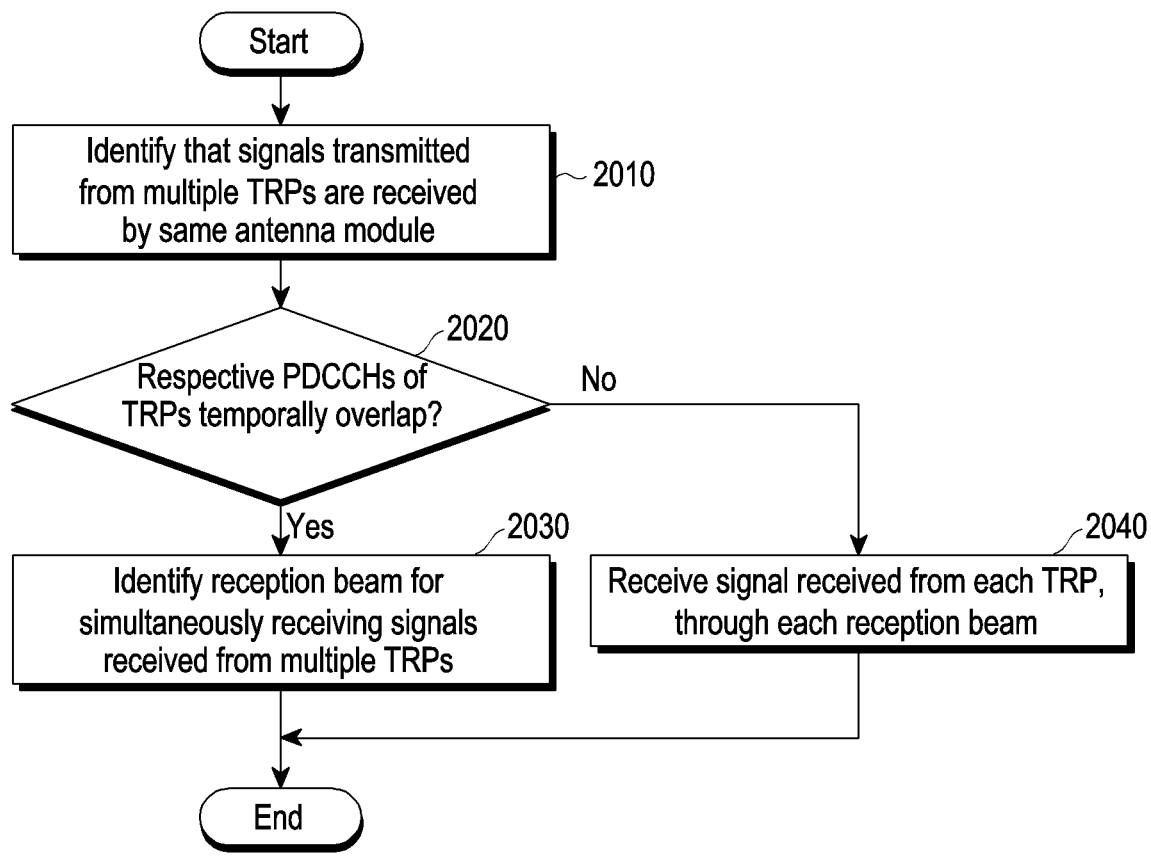
FIG. 20 is a flowchart illustrating an operation method of an electronic device according to an embodiment of the disclosure.

FIG. 20 is a flowchart illustrating an operation method of an electronic device according to an embodiment of the disclosure.

Referring to FIG. 20, according to various embodiments of the disclosure, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify that the same antenna module receives the signals transmitted from a plurality of TRPs in operation 2010. The operation of identifying that the signals transmitted from the plurality of TRPs are received by the same antenna module may be performed by the method described above in connection with FIG. 19.

According to various embodiments of the disclosure, the electronic device 101 may identify whether PDCCHs transmitted from the plurality of TRPs temporally overlap, in operation 2020. For example, the electronic device 101 may identify whether the first PDCCH transmitted from the first TRP 701 and the second PDCCH transmitted from the second TRP 702 temporally overlap. If it is identified that the respective PDCCHs of the plurality of TRPs temporally overlap in operation 2020 (Yes in operation 2020), the electronic device 101 may identify a reception beam for simultaneously receiving the signals received from the plurality of TRPs in operation 2030. For example, as described above in connection with FIGS. 18 and 19, the electronic device 101 may set the reception beam having the largest probability of receiving the PDCCH based on Table 5 and Equation 1, as the third reception beam. The electronic device 101 may simultaneously receive the first PDCCH transmitted from the first TRP 701 and the second PDCCH transmitted from the second TRP 702 through the same antenna module, based on the set third reception beam.

According to various embodiments of the disclosure, if it is identified that the respective PDCCHs of the plurality of TRPs do not temporally overlap in operation 2020 (No in operation 2020), the electronic device 101 may identify the signal received from each TRP through each reception beam in operation 2040. For example, the electronic device 101 may receive the first PDCCH through the 1-1th reception beam 1611 set as the optimal reception beam corresponding to the first TRP 701 at the time of receiving the first PDCCH transmitted from the first TRP 701 and receive the second PDCCH through the 1-3th reception beam 1613 set as the optimal reception beam corresponding to the second TRP 702 at the time of receiving the second PDCCH transmitted from the second TRP 702.

Figure 21:
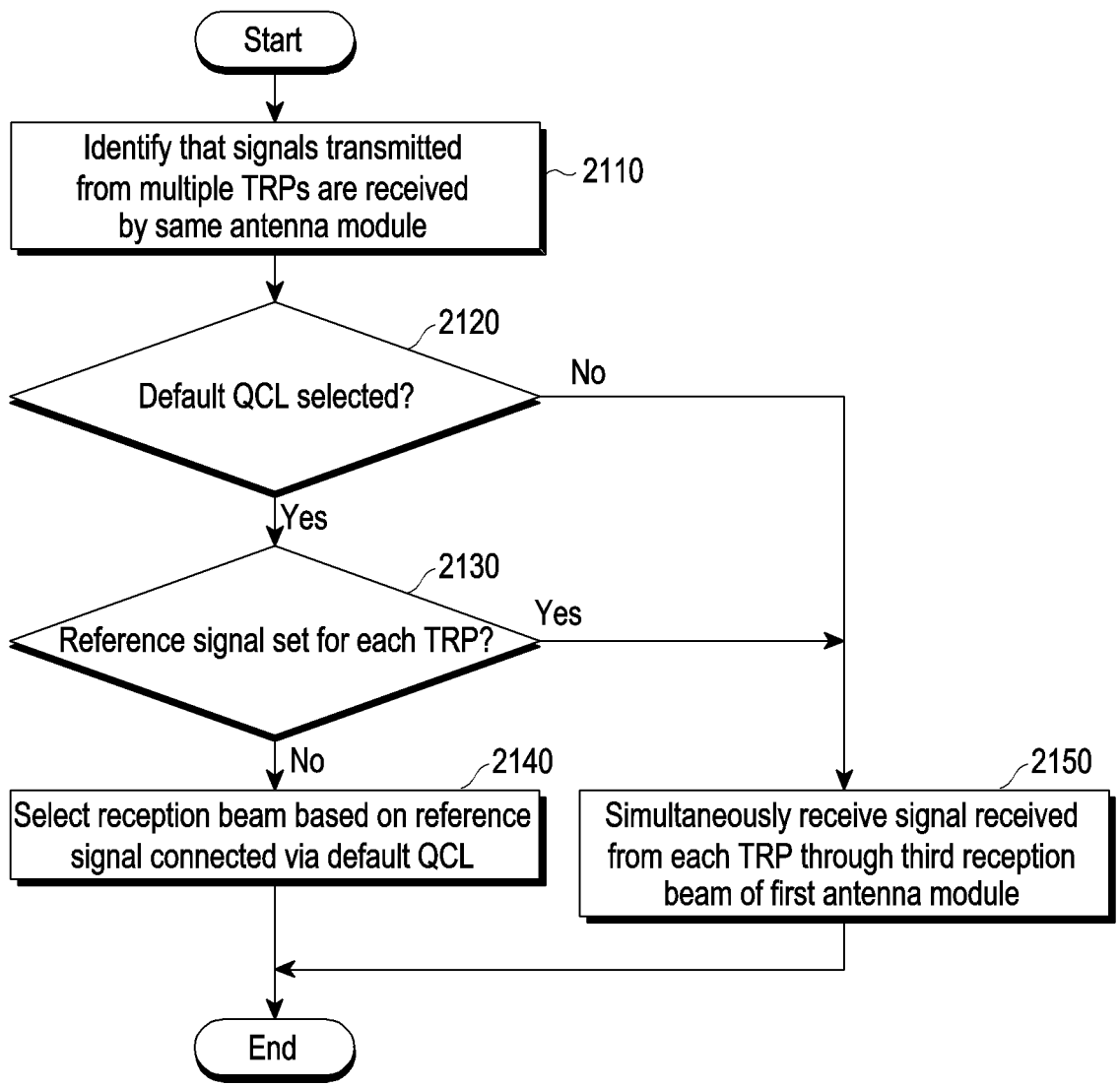
FIG. 21 is a flowchart illustrating an operation method of an electronic device according to an embodiment of the disclosure.

FIG. 21 is a flowchart illustrating an operation method of an electronic device according to an embodiment of the disclosure.

Referring to FIG. 21, according to various embodiments of the disclosure, an electronic device 101 (e.g., at least one of the processor 120 of FIG. 1, the first communication processor 212 of FIG. 2A, the second communication processor 214 of FIG. 2A, or the integrated communication processor 260 of FIG. 2B) may identify that the same antenna module receives the signals transmitted from a plurality of TRPs in operation 2110. The operation of identifying that the signals transmitted from the plurality of TRPs are received by the same antenna module may be performed by the method described above in connection with FIG. 19.

According to various embodiments of the disclosure, in operation 2120, the electronic device 101 may identify whether a default QCL is selected. For example, as described above, when a scheduling time offset set in the PDSCH scheduled by NC-JT is smaller than the timeDurationForQCL, the reception beam may be set according to the default QCL. According to various embodiments of the disclosure, the electronic device 101 may identify whether the default QCL indicates a reference signal setting for each TRP, in operation 2130. As a result of the identification, when the default QCL indicates the reference signal setting for each TRP (Yes in operation 2130), the electronic device 101 may receive the signal received from each TRP based on the third reception beam of the first antenna module. The method for setting the third reception beam in the electronic device 101 may use the method described above in connection with FIGS. 18 and 19.

According to various embodiments of the disclosure, as a result of identification in operation 2130, when the default QCL does not indicate the reference signal setting for each TRP (No in operation 2130), the electronic device 101 may select the reception beam based on one reference signal connected via the default QCL in operation 2140. According to various embodiments of the disclosure, as a result of the identification in operation 2120, when it is identified that the default QCL is not selected (No in operation 2120), the electronic device 101 may simultaneously receive the signals received from each TRP through the third reception beam of the first antenna module in operation 2150. The method for setting the third reception beam in the electronic device 101 may use the method described above in connection with FIGS. 18 and 19. For example, when the scheduling time offset set in the PDSCH scheduled by NC-JT exceeds the timeDurationForQCL, the reference signal (e.g., CSI-RS) may be identified for each TRP according to the TCI set in DCI. The electronic device 101 may determine the third reception beam based on the identified reference signal for each TRP. The electronic device 101 may receive the signal received from each TRP in operation 2150 based on the third reception beam of the first antenna module. The method for setting the third reception beam in the electronic device 101 may use the method described above in connection with FIGS. 18 and 19.

According to various embodiments of the disclosure, when receiving PDSCH signals transmitted from the plurality of TRPs by the same antenna module, the electronic device 101 may determine the third reception beam based on the reception probabilities of PDSCHs. For example, for convenience of description, it may be assumed that the reference signal connected, via the QCL, with the PDSCH transmitted from the first TRP 701 is X, and the reference signal connected, via the QCL, with the PDSCH transmitted from the second TRP 702 is Y. It may be assumed that the SINR when the electronic device 101 receives X through the reception beam i is SINR(i,X), and the SINR when the electronic device 101 receives Y through the reception beam i is SINR(i,Y). According to various embodiments of the disclosure, the electronic device 101 may calculate the capacity of receiving the PDSCHs transmitted from each TRP when the reception beam i is used from SINR(i,X) and SINR(i,Y) and may set the beam i for maximizing it as the third receive beam. The electronic device 101 may simultaneously receive the PDSCH transmitted from the first TRP 701 and the PDSCH transmitted from the second TRP 702 based on the set third reception beam, increasing the capacity of receiving the PDSCHs. For example, the capacity of receiving the PDSCHs transmitted from each TRP may be determined through the mapping table of Table 7 below. For example, the SINR and spectral efficiency of each reference signal may be stored in a table form as shown in Table 7 below.

TABLE 7

| SINR(dB) | spectral efficiency |
|---|---|
| −5 or less | 0.3964 |
| −5 ~ −4.5 | 0.4381 |
| . . . | . . . |
| 23.5 ~ 24 | 7.813 |
| 24 or more | 7.9784 |

According to various embodiments of the disclosure, the electronic device 101 may calculate the transmission rate according to the reception of the PDSCHs transmitted from each TRP when the reception beam i is used from SINR(i,X) and SINR(i,Y) and may set the reception beam for maximizing it. For example, the electronic device 101 may calculate the spectral efficiencies of the PDSCH to be received from each TRP based on the SINR value received from each TRP with reference to Table 7 above and compare the summated spectral efficiencies when receiving the PDSCHs from the plurality of TRPs based on the calculated spectral efficiencies to determine the optimal reception beam.

Figure 22:
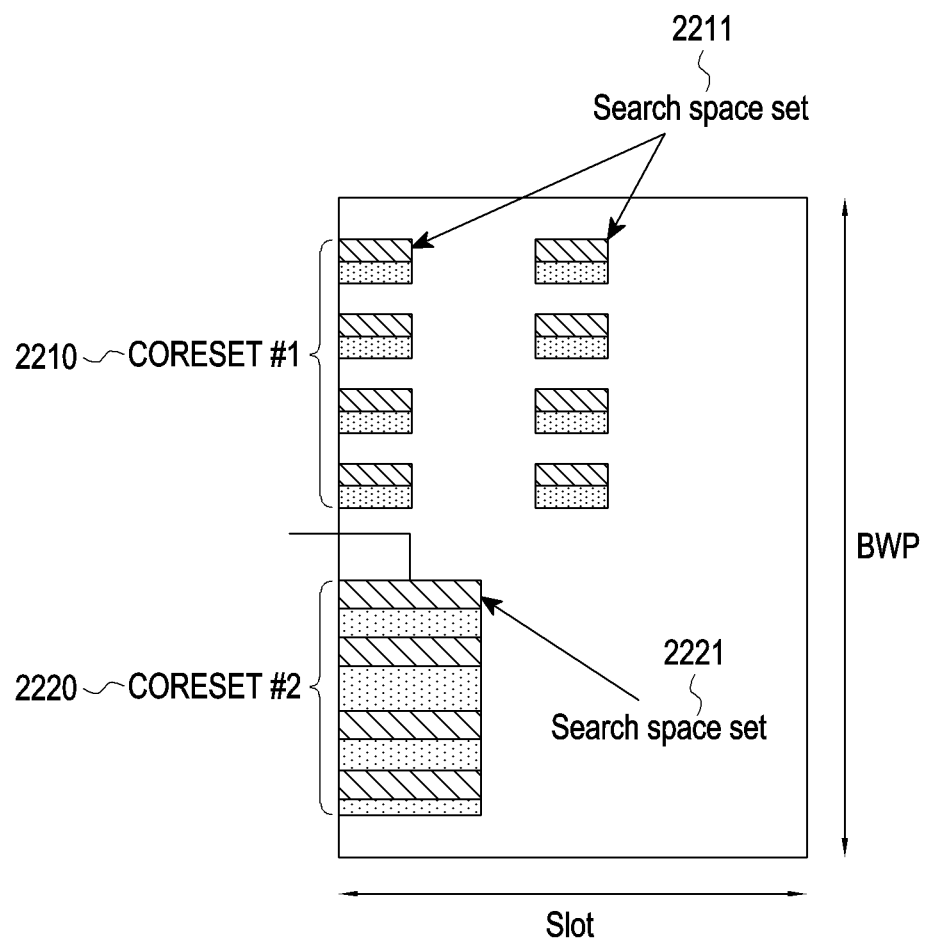
FIG. 22 is a view illustrating a method for identifying a reference signal in an NC-JT system, according to an embodiment of the disclosure.

FIG. 22 is a view illustrating a method for identifying a reference signal in an NC-JT system, according to an embodiment of the disclosure.

Referring to FIG. 22, the default QCL may indicate only one reference signal according to the RRC configuration. For example, in the 3GPP standard document Rel-16, it is defined that if "enableDefaultTCIStatePerCoresetPoolIndex" is not set in the RRC message, the electronic device 101 references only one reference signal connected, via the QCL, to the CORESET having the lowest index among the CORESETs connected with the search space set in the latest slot without TRP distinction. In this case, since the optimal reception beam for the corresponding reference signal may be used, it may not be needed to change to a new beam. For example, the electronic device 101 may continuously use the reception beam used in the CORESET having the lowest index (lowest CORESET) monitored in the latest slot. For example, referring to FIG. 22, the reception beam may be set based on one reference signal (e.g., CSI-RS) connected, via the QCL, to CORESET #1 2210 which is the CORESET having the lower index of CORESET #1 2210 and CORESET #2 2220 connected with the search spaces 2211 and 2221 set in the latest slot.

Figure 23:
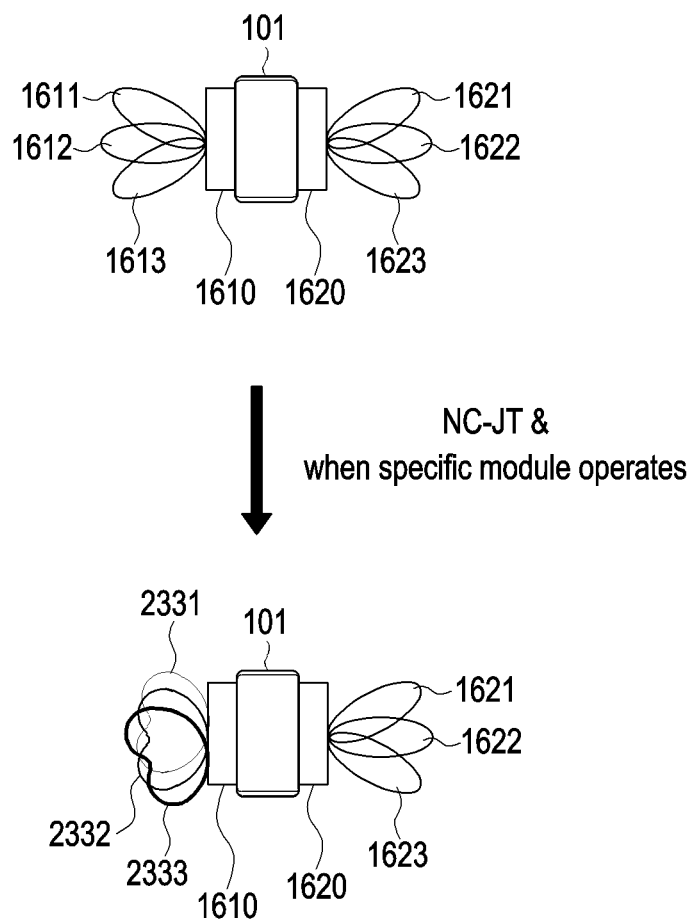
FIG. 23 is a view illustrating reception beam selection in an NC-JT system, according to an embodiment of the disclosure.
Figure 24A:
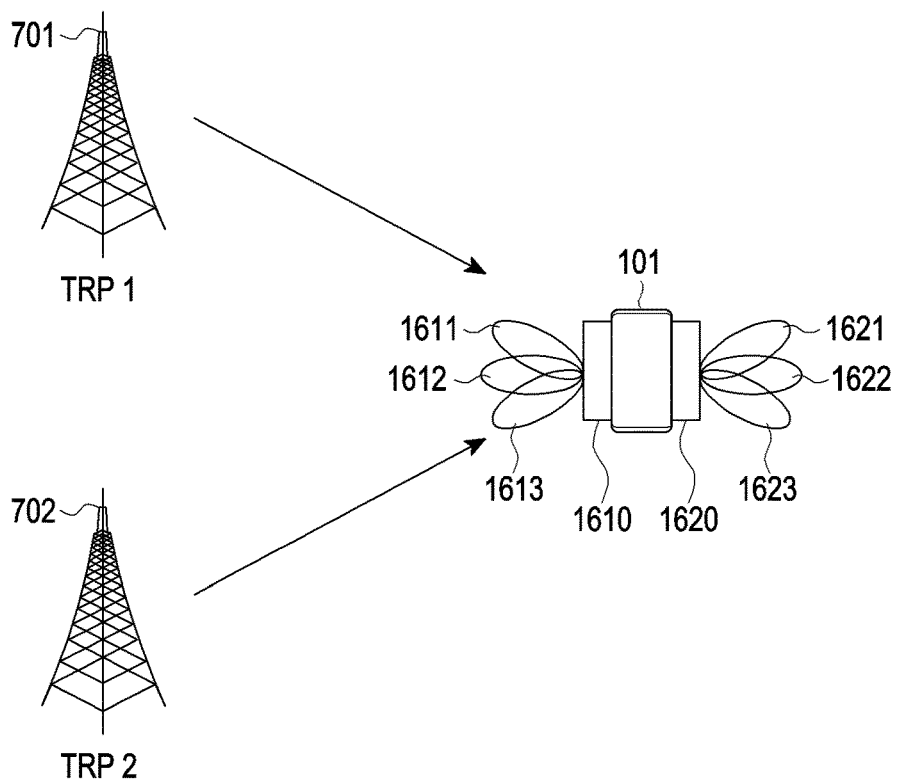
FIG. 24A is a view illustrating reception beam selection in an NC-JT system, according to an embodiment of the disclosure.
Figure 24B:
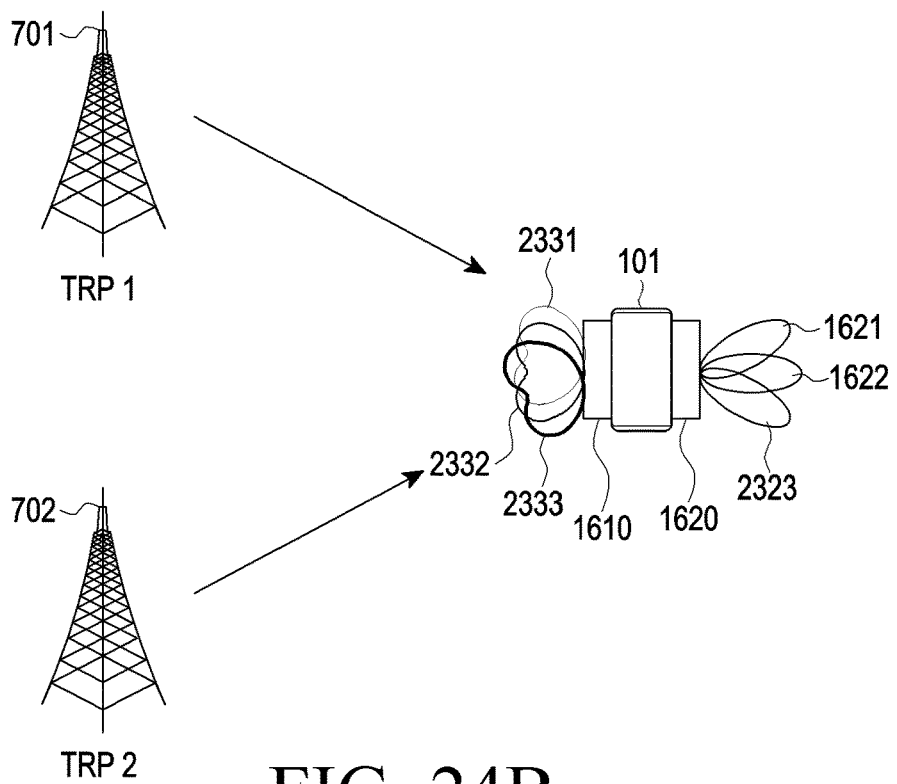
FIG. 24B is a view illustrating reception beam selection in an NC-JT system, according to an embodiment of the disclosure.

FIGS. 23, 24A, and 24B are views illustrating reception beam selection in an NC-JT system, according to an embodiment of the disclosure.

Referring to FIG. 23, when it is determined that the electronic device 101 should operate with one specific antenna module (e.g., the first antenna module 1610) in the NC-JT context, the electronic device 101 may change the type of the reception beam. For example, when the electronic device 101 simultaneously receives signals transmitted from a plurality of TRPs through the one antenna module, the electronic device 101 may change the beam set from the first beam set including narrow beams to the second beam set including wide beams.

According to various embodiments of the disclosure, referring to FIG. 23, upon receiving the signal transmitted from the first TRP 701 by the first antenna module 1610 and the signal transmitted from the second TRP 702 by the second antenna module 1620, the electronic device 101 may receive the signal transmitted from the first TRP 701 through the optimal reception beam (e.g., the 1-1th reception beam 1611) among the narrow beams 1611, 1612, and 1613 corresponding to the first antenna module 1610 and receive the signal transmitted from the first TRP 701 through the optimal reception beam (e.g., the 2-1th reception beam 1621) among the narrow beams 1621, 1622, and 1623 corresponding to the second antenna module 1620.

Referring to FIGS. 24A and 24B, according to various embodiments of the disclosure, when it is determined that the electronic device 101 should operate with one specific antenna module (e.g., the first antenna module 1610) in the NC-JT context, the electronic device 101 may change the beam set from the first beam set including the narrow beams as shown in FIG. 24A to the second beam set including the wide beams as shown in FIG. 24B and determine the optimal reception beam. For example, it may be assumed that the first beam set including narrow beams includes the 1-1th reception beam 1611, the 1-2th reception beam 1612, and the 1-3th reception beam 1613 and that the second beam set including wide beams may include the 3-1th reception beam 2331, the 3-2th reception beam 2332, and the 3-3th reception beam 2333. When the electronic device 101 determines that it should operate with one specific antenna module (e.g., the first antenna module 1610) in the NC-JT context, as shown in FIG. 24A, the electronic device 101 may measure the reception strength of the reference signal for the reception beams included in the second beam set and set the optimal reception beam (e.g., the 3-2th reception beam 2332) based on the measurement result of the reception strength.

Figure 25:
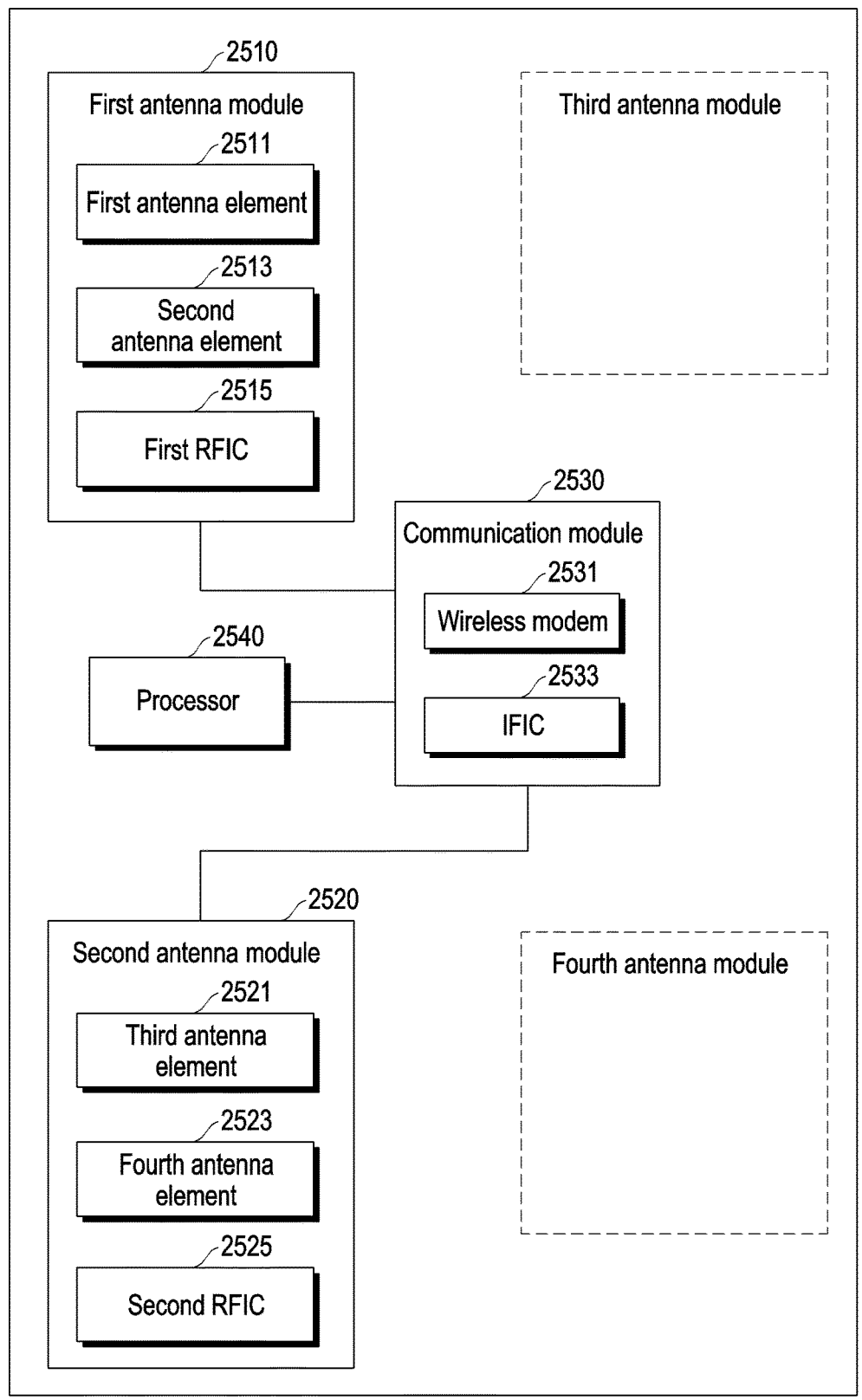
FIG. 25 is a block diagram illustrating an electronic device including a plurality of antenna modules according to an embodiment of the disclosure.

FIG. 25 is a block diagram illustrating an electronic device including a plurality of antenna modules according to an embodiment of the disclosure.

Referring to FIG. 25, it illustrates an example in which the first antenna module 2510 includes two antenna elements (e.g., a first antenna element 2511 and a second element 2513), and the second antenna module 2520 includes two antenna elements (e.g., a third antenna element 2521 and a fourth antenna element 2523), but this is for convenience of description according to an embodiment of the disclosure. The first antenna module 2510 or the second antenna module 2520 may include three or more antenna elements.

According to various embodiments of the disclosure, the communication module 2530 may include an IFIC 2533 and a wireless modem 2531. The wireless modem 2531 may transmit/receive data to and from the IFIC 2533. The wireless modem 2531 may be referred to by various terms including a 5G modem and a communication processor (CP). According to an embodiment of the disclosure, the wireless modem 2531 may transmit a digital to analog conversion (DAC) signal to the IFIC 2533. The DAC signal may correspond to a signal resultant from converting the digital signal transmitted from the processor 2540 to the wireless modem 2531 into an analog signal. The converted analog signal may correspond to a signal of a baseband frequency. According to an embodiment of the disclosure, the wireless modem 2531 may transmit an analog to digital conversion (ADC) signal to the processor 2540. The ADC signal may correspond to a signal resultant from receiving, from the IFIC 2533, the signal obtained by down-converting the frequency of the analog signal received from an external electronic device (e.g., the electronic device 102) and converting the received analog signal into a digital signal.

According to various embodiments of the disclosure, the IFIC 2533 may convert the frequency band and transmit and receive signals to and from the wireless modem 2531. For example, the IFIC 2533 may receive the signal down-converted into an intermediate frequency band from the first RFIC 2515 or the second RFIC 2525 and may down-convert the received signal into a baseband frequency. As another example, the IFIC 2533 may receive the baseband signal from the wireless modem 2531 and may up-convert the frequency band of the received baseband signal into the intermediate frequency band. According to various embodiments of the disclosure, the wireless modem 2531 and the IFIC 2533 may be integrated into one module. For example, the wireless modem 2531 and the IFIC 2533 may be disposed on a main PCB (not shown).

In the above-described embodiments of the disclosure, the electronic device 101 is described as including only the first antenna module 2510 and the second antenna module 2520, but is not limited thereto. According to various embodiments of the disclosure, the electronic device 101 may further include a third antenna module and a fourth antenna module.

Referring to FIG. 25, the third antenna module and the fourth antenna module, respectively, may correspond to the components denoted by dashed lines. In various embodiments of the disclosure, the first antenna module 2510 and the second antenna module 2520 may be disposed on sides of a lower end of the electronic device 101, and each of the third antenna module and the fourth antenna module may be disposed on the rear surface of the electronic device 101.

According to any one of various embodiments of the disclosure, an electronic device 101 may comprise a plurality of antenna modules, and a communication processor. The communication processor may be configured to identify information set for reception of different signals transmitted from a plurality of transmission and reception points (TRPs), identify information related to a strength of a reference signal corresponding to a first TRP among the plurality of TRPs and information related to a strength of a reference signal corresponding to a second TRP among the plurality of TRPs, for a plurality of reception beams set in the plurality of antenna modules, respectively, based on the set information, identify that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP, and receive a signal corresponding to the first TRP and a signal corresponding to the second TRP based on a third reception beam of the first antenna module, based on identifying that the first reception beam and the second reception beam are selected.

According to various embodiments of the disclosure, the information related to the strength of the reference signal corresponding to the first TRP may include information related to a strength of a reference signal received corresponding to the first TRP, and the information related to the strength of the reference signal corresponding to the second TRP includes information related to a strength of a reference signal received corresponding to the second TRP.

According to various embodiments of the disclosure, the reference signal may include a channel state information-reference signal (CSI-RS) or a synchronization signal block (SSB).

According to various embodiments of the disclosure, the information related to the strength of the reception signal may include any one selected from among a reference signal received power (RSRP), a received strength signal indicator (RSSI), a reference signal received quality (RSRQ), or a signal to interference plus noise ratio (SINR).

According to various embodiments of the disclosure, the communication processor may set the third reception beam based on a probability of receiving a first physical downlink control channel (PDCCH) signal transmitted from the first TRP and a second PDCCH signal transmitted from the second TRP among a plurality of reception beams set for the first antenna module.

According to various embodiments of the disclosure, the communication processor may set the third reception beam based on identifying that the first PDCCH and the second PDCCH temporally overlap.

According to various embodiments of the disclosure, the communication processor may set the third reception beam based on a capacity of receiving a physical downlink shared channel (PDSCH) signal transmitted from the first TRP and a PDSCH signal transmitted from the second TRP among a plurality of reception beams set for the first antenna module.

According to various embodiments of the disclosure, the communication processor may identify whether a default quasi co location (QCL) is selected, and set the third reception beam based on identifying that the default QCL is not selected.

According to various embodiments of the disclosure, the communication processor may identify whether a default quasi co location (QCL) is selected, identify whether a plurality of reference signals for the plurality of TRPs are set, based on identifying that the default QCL is selected, and set the third reception beam based on identifying that the plurality of reference signals for the plurality of TRPs are set.

According to various embodiments of the disclosure, the communication processor may identify whether a default quasi co location (QCL) is selected, identify whether a plurality of reference signals for the plurality of TRPs are set, based on identifying that the default QCL is selected, and set a reception beam based on the same reference signal, based on identifying that the same reference signal for the plurality of TRPs is set.

According to any one of various embodiments of the disclosure, a method for setting a reception beam by an electronic device may comprise identifying information set for reception of different signals transmitted from a plurality of transmission and reception points (TRPs), identifying information related to a strength of a reference signal corresponding to a first TRP among the plurality of TRPs and information related to a strength of a reference signal corresponding to a second TRP among the plurality of TRPs, for a plurality of reception beams set in the plurality of antenna modules, respectively, included in the electronic device, based on the set information, identifying that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP, and receiving a signal corresponding to the first TRP and a signal corresponding to the second TRP based on a third reception beam of the first antenna module, based on identifying that the first reception beam and the second reception beam are selected.

According to various embodiments of the disclosure, the information related to the strength of the reference signal corresponding to the first TRP may include information related to a strength of a reference signal received corresponding to the first TRP, and the information related to the strength of the reference signal corresponding to the second TRP includes information related to a strength of a reference signal received corresponding to the second TRP.

According to various embodiments of the disclosure, the reference signal may include a channel state information-reference signal (CSI-RS) or a synchronization signal block (SSB).

According to various embodiments of the disclosure, the information related to the strength of the reception signal may include any one selected from among a reference signal received power (RSRP), a received strength signal indicator (RSSI), a reference signal received quality (RSRQ), or a signal to interference plus noise ratio (SINR).

According to various embodiments of the disclosure, the method may further comprise setting the third reception beam based on a probability of receiving a first physical downlink control channel (PDCCH) signal transmitted from the first TRP and a second PDCCH signal transmitted from the second TRP among a plurality of reception beams set for the first antenna module.

According to various embodiments of the disclosure, the method may further comprise setting the third reception beam based on identifying that the first PDCCH and the second PDCCH temporally overlap.

According to various embodiments of the disclosure, the method may further comprise setting the third reception beam based on a capacity of receiving a physical downlink shared channel (PDSCH) signal transmitted from the first TRP and a PDSCH signal transmitted from the second TRP among a plurality of reception beams set for the first antenna module.

According to various embodiments of the disclosure, the method may further comprise identifying whether a default quasi co location (QCL) is selected, and setting the third reception beam, based on identifying that the default QCL is not selected.

According to various embodiments of the disclosure, the method may further comprise identifying whether a default quasi co location (QCL) is selected, identifying whether a plurality of reference signals for the plurality of TRPs are set, based on identifying that the default QCL is selected, and setting the third reception beam based on identifying that the plurality of reference signals for the plurality of TRPs are set.

According to various embodiments of the disclosure, the method may further comprise identifying whether a default quasi co location (QCL) is selected, identifying whether a plurality of reference signals for the plurality of TRPs are set, based on identifying that the default QCL is selected, and setting a reception beam based on the same reference signal, based on identifying that the same reference signal for the plurality of TRPs is set.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a plurality of antenna modules; and
a communication processor,
wherein the communication processor is configured to:
identify information set for reception of different signals transmitted from a plurality of transmission and reception points (TRPs),
identify information related to a strength of a reference signal corresponding to a first TRP among the plurality of TRPs and information related to a strength of a reference signal corresponding to a second TRP among the plurality of TRPs, for a plurality of reception beams set in the plurality of antenna modules, respectively, based on the set information,
identify that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP, and
receive a signal corresponding to the first TRP and a signal corresponding to the second TRP based on a third reception beam of the first antenna module, based on identifying that the first reception beam and the second reception beam are selected.

2. The electronic device of claim 1,
wherein the information related to the strength of the reference signal corresponding to the first TRP includes information related to a strength of a reference signal received corresponding to the first TRP, and
wherein the information related to the strength of the reference signal corresponding to the second TRP includes information related to a strength of a reference signal received corresponding to the second TRP.

3. The electronic device of claim 2, wherein the reference signal includes a channel state information-reference signal (CSI-RS) or a synchronization signal block (SSB).

4. The electronic device of claim 1, wherein the information related to the strength of the reception signal includes any one selected from among a reference signal received power (RSRP), a received strength signal indicator (RSSI), a reference signal received quality (RSRQ), or a signal to interference plus noise ratio (SINR).

5. The electronic device of claim 1, wherein the communication processor is further configured to: set the third reception beam, based on a probability of receiving a first physical downlink control channel (PDCCH) signal transmitted from the first TRP and a second PDCCH signal transmitted from the second TRP among a plurality of reception beams set for the first antenna module.

6. The electronic device of claim 5, wherein the communication processor is further configured to: set the third reception beam, based on identifying that the first PDCCH and the second PDCCH temporally overlap.

7. The electronic device of claim 1, wherein the communication processor is further configured to: set the third reception beam, based on a capacity of receiving a physical downlink shared channel (PDSCH) signal transmitted from the first TRP and a PDSCH signal transmitted from the second TRP among a plurality of reception beams set for the first antenna module.

8. The electronic device of claim 1, wherein the communication processor is further configured to:
identify whether a default quasi co location (QCL) is selected, and
set the third reception beam, based on identifying that the default QCL is not selected.

9. The electronic device of claim 1, wherein the communication processor is further configured to:
identify whether a default quasi co location (QCL) is selected,
identify whether a plurality of reference signals for the plurality of TRPs are set, based on identifying that the default QCL is selected, and
set the third reception beam, based on identifying that the plurality of reference signals for the plurality of TRPs are set.

10. The electronic device of claim 1, wherein the communication processor is further configured to:
identify whether a default quasi co location (QCL) is selected, identify whether a plurality of reference signals for the plurality of TRPs are set, based on identifying that the default QCL is selected, and set a reception beam based on the same reference signal, based on identifying that the same reference signal for the plurality of TRPs is set.

11. A method for setting a reception beam by an electronic device, the method comprising:

identifying information set for reception of different signals transmitted from a plurality of transmission and reception points (TRPs);

identifying information related to a strength of a reference signal corresponding to a first TRP among the plurality of TRPs and information related to a strength of a reference signal corresponding to a second TRP among the plurality of TRPs, for a plurality of reception beams set in a plurality of antenna modules, respectively, included in the electronic device, based on the set information;

identifying that a first reception beam of a first antenna module among the plurality of antenna modules is selected to receive a signal transmitted from the first TRP and a second reception beam of the first antenna module is selected to receive a signal transmitted from the second TRP, based on the information related to the strength of the reference signal corresponding to the first TRP and the information related to the strength of the reference signal corresponding to the second TRP; and receiving a signal corresponding to the first TRP and a signal corresponding to the second TRP based on a third reception beam of the first antenna module, based on identifying that the first reception beam and the second reception beam are selected.

12. The method of claim 11, wherein the information related to the strength of the reference signal corresponding to the first TRP includes information related to a strength of a reference signal received corresponding to the first TRP, and wherein the information related to the strength of the reference signal corresponding to the second TRP includes information related to a strength of a reference signal received corresponding to the second TRP.

13. The method of claim 12, wherein the reference signal includes a channel state information-reference signal (CSI-RS) or a synchronization signal block (SSB).

14. The method of claim 11, wherein the information related to the strength of the reception signal includes any one selected from among a reference signal received power (RSRP), a received strength signal indicator (RSSI), a reference signal received quality (RSRQ), or a signal to interference plus noise ratio (SINR).

15. The method of claim 11, further comprising:

setting the third reception beam, based on a probability of receiving a first physical downlink control channel (PDCCH) signal transmitted from the first TRP and a second PDCCH signal transmitted from the second TRP among a plurality of reception beams set for the first antenna module.

16. The method of claim 15, further comprising:

setting the third reception beam, based on identifying that the first PDCCH and the second PDCCH temporally overlap.

17. The method of claim 11, further comprising:

setting the third reception beam, based on a capacity of receiving a physical downlink shared channel (PDSCH) signal transmitted from the first TRP and a PDSCH signal transmitted from the second TRP among a plurality of reception beams set for the first antenna module.

18. The method of claim 11, further comprising:

identifying whether a default quasi co location (QCL) is selected; and setting the third reception beam, based on identifying that the default QCL is not selected.

19. The method of claim 11, further comprising:

identifying whether a default quasi co location (QCL) is selected;

identifying whether a plurality of reference signals for the plurality of TRPs are set, based on identifying that the default QCL is selected; and setting the third reception beam, based on identifying that the plurality of reference signals for the plurality of TRPs are set.

20. The method of claim 11, further comprising:

identifying whether a default quasi co location (QCL) is selected;

identifying whether a plurality of reference signals for the plurality of TRPs are set, based on identifying that the default QCL is selected; and setting a reception beam based on the same reference signal, based on identifying that the same reference signal for the plurality of TRPs is set.

* * * * *